United States Patent [19]
Ozaki et al.

[11] Patent Number: 5,168,497
[45] Date of Patent: Dec. 1, 1992

[54] PACKET COMMUNICATION PROCESSING METHOD

[75] Inventors: Seiichi Ozaki, Koganei; Michio Asano, Tokorozawa; Yoshihiro Takiyasu, Higashimurayama, all of Japan

[73] Assignee: Hitachi, Ltd., Tokyo, Japan

[21] Appl. No.: 409,620

[22] Filed: Sep. 19, 1989

[30] Foreign Application Priority Data

Sep. 21, 1988 [JP] Japan ................. 63-234983

[51] Int. Cl.$^5$ .................. H04L 12/56; H04L 1/18
[52] U.S. Cl. .................. 370/94.1; 370/94.3; 371/32; 371/33
[58] Field of Search ........... 370/94.1, 94.2, 85.13, 370/85.14, 85.1, 91, 94.3, 60, 60.1; 371/32, 33, 12; 340/826, 827

[56] References Cited

U.S. PATENT DOCUMENTS

| | | | |
|---|---|---|---|
| 4,074,232 | 2/1978 | Otomo et al. | 371/32 |
| 4,726,027 | 2/1988 | Nakamura et al. | 371/32 |
| 4,779,274 | 10/1988 | Takahashi et al. | 371/32 |
| 4,799,215 | 1/1989 | Suzuki | 370/94.1 |
| 4,841,526 | 6/1989 | Wilson et al. | 371/32 |
| 4,896,151 | 1/1990 | Kuranami et al. | 370/94.1 |
| 4,951,278 | 8/1990 | Biber et al. | 370/60 |

OTHER PUBLICATIONS

CCITT (The Internation Telegraph and Telephone Counsultative Committee) Red Book, vol. VIII-Fascicle VIII.3, Data Communication Networks Interfaces Recommendations X.20-X-32, VIIIth Plenary Assembly, Malaga-Torremolinos, 8-19 Oct. 1984, Geneva 1985, ISBN 92-61-02321-5, pp. 108-155.

Primary Examiner—Douglas W. Olms
Assistant Examiner—H. Kizou
Attorney, Agent, or Firm—Fay, Sharpe, Beall, Fagan, Minnich & McKee

[57] ABSTRACT

A packet communication processing method in a communication apparatus which performs communication with end apparatus for performing data link layer processing according to a data link protocol such as HDLC or similar protocol, in which method information frames (I frames) are received regardless of the rightness of a sending sequence number N(S) which is included in a control field (C field) in each of the received information so as to indicate the sequence of the I frames.

9 Claims, 19 Drawing Sheets

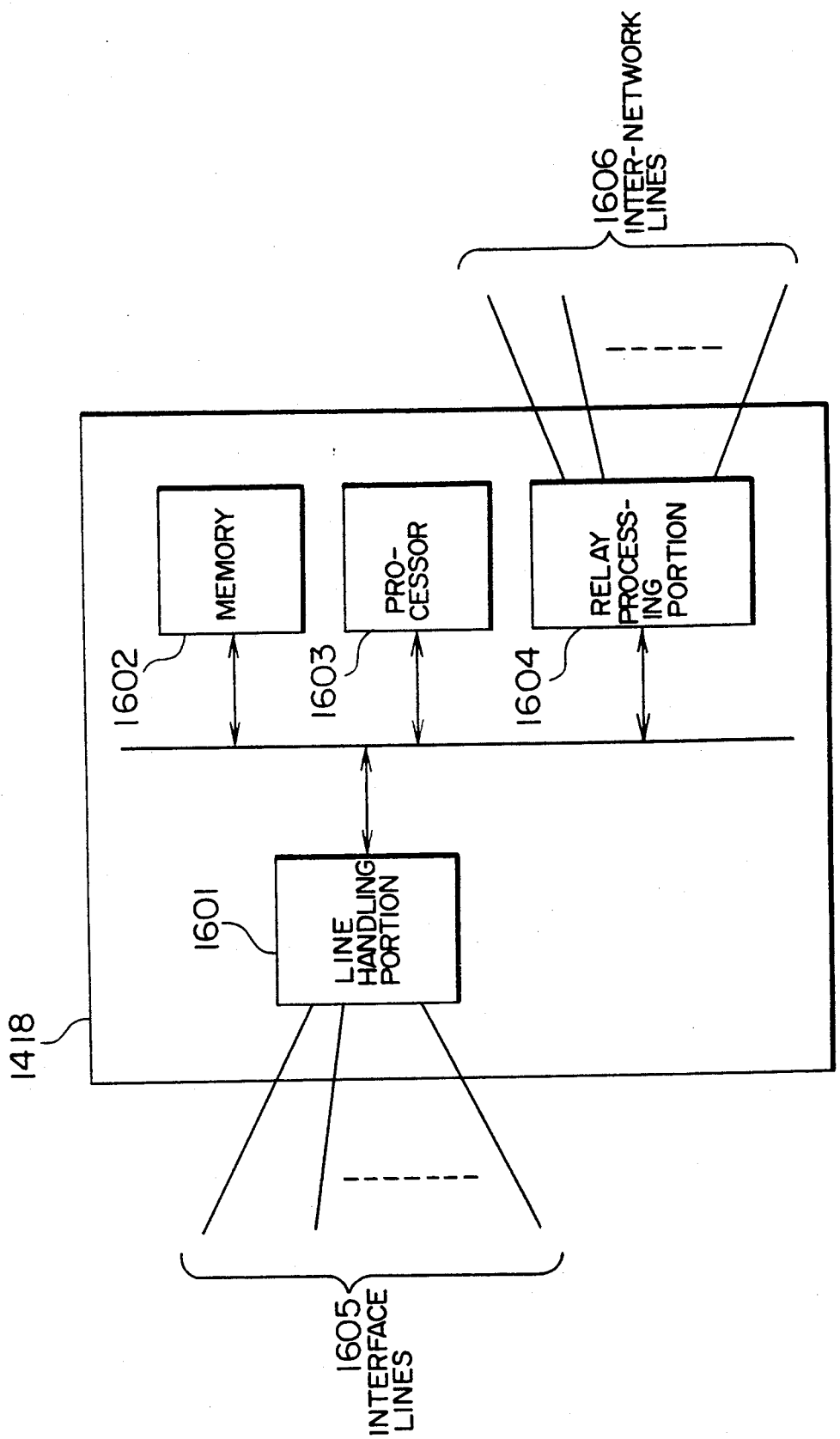

FIG. 19A

STATUS TRANSITION TABLE

| STATUS / STATUS TRANSITION FACTOR | CONTENTS | SABM COMMAND RECEIVING STANDBY | UA RESPONSE NOT YET SENT | AFTER SENDING OF F BIT = "1" | | | | AFTER RECEIVING OF P BIT = "1" | | | | UA RESPONSE NOT YET SENT |
|---|---|---|---|---|---|---|---|---|---|---|---|---|
| | | | | OTHER STATION NON-BUSY | | OTHER STATION BUSY | | OTHER STATION NON-BUSY | | OTHER STATION BUSY | | |
| | | | | ONE STATION NON-BUSY | ONE STATION BUSY | ONE STATION NON-BUSY | ONE STATION BUSY | ONE STATION NON-BUSY | ONE STATION BUSY | ONE STATION NON-BUSY | ONE STATION BUSY | |
| | | a | b | c | d | e | f | g | h | i | j | k |
| BUSY OCCUR | | ✕ | ✕ | d | ✕ | f | ✕ | h | ✕ | j | ✕ | ✕ |
| BUSY REMOVED | | ✕ | ✕ | ✕ | c | ✕ | e | ✕ | g | ✕ | i | ✕ |
| I, P SEND | | ✕ | ✕ | ○ 003 | ○ 003 | ✕ | ✕ | ✕ | ✕ | ✕ | ✕ | ✕ |
| I, P̄ SEND | | ✕ | ✕ | ○ 003 | ○ 003 | ✕ | ✕ | ✕ | ✕ | ✕ | ✕ | ✕ |
| P OTHER THAN I SEND | | ✕ | ✕ | ○ 004 | ○ 004 | ○ 004 | ○ 004 | ✕ | ✕ | ✕ | ✕ | ✕ |
| P̄/F̄ OTHER THAN I SEND | | ✕ | ✕ | ○ 004 | ○ 004 | ○ 004 | ○ 004 | ✕ | ✕ | ✕ | ✕ | ✕ |
| F OTHER THAN I SEND | | ✕ | c 002 | ✕ | ✕ | ✕ | ✕ | c 004 | d 004 | e 004 | f 004 | a 011 |
| FRAME RECEIVING | I, P̄ | ✕ | ✕ | ○ 005 | ✕ | ○ 005 | ✕ | ○ 005 | ✕ | ○ 005 | ✕ | ✕ |
| | I, P | ✕ | ✕ | g 005 | h 010 | i 005 | j 010 | ✕ | ✕ | ✕ | ✕ | ✕ |
| | RR, F | ✕ | ✕ | ○ 006 | ○ 006 | c 006 | d 006 | ○ 006 | ○ 006 | g 006 | h 006 | ✕ |
| | RR, P̄/F̄ | ✕ | ✕ | ○ 006 | ○ 006 | c 006 | d 006 | ○ 006 | ○ 006 | g 006 | h 006 | ✕ |
| | RR, P | ✕ | ✕ | g 006 | h 006 | g 006 | h 006 | ✕ | ✕ | ✕ | ✕ | ✕ |
| | RNR, F | ✕ | ✕ | e 006 | f 006 | ○ 006 | ○ 006 | i 006 | j 006 | ○ 006 | ○ 006 | ✕ |

FIG. 19B

STATUS TRANSITION TABLE (CONTINUED)

| STATUS TRANSITION FACTOR / STATUS SYMBOLS / CONTENTS | SABM COMMAND RECEIVING STANDBY | UA RESPONSE NOT YET SENT | AFTER SENDING OF F BIT = "1" | | | | AFTER RECEIVING OF P BIT = "1" | | | | UA RESPONSE NOT YET SENT |
|---|---|---|---|---|---|---|---|---|---|---|---|
| | | | OTHER STATION NON-BUSY | | OTHER STATION BUSY | | OTHER STATION NON-BUSY | | OTHER STATION BUSY | | |
| | | | ONE STATION NON-BUSY | ONE STATION BUSY | ONE STATION NON-BUSY | ONE STATION BUSY | ONE STATION NON-BUSY | ONE STATION BUSY | ONE STATION NON-BUSY | ONE STATION BUSY | |
| | a | b | c | d | e | f | g | h | i | j | k |
| FRAME RECEIVING — RNR, $\overline{P/F}$ | | | e 006 | f 006 | O 006 | O 006 | i 006 | j 006 | O 006 | O 006 | |
| RNR, P | | | i 006 | j 006 | i 006 | j 006 | | | | | |
| REJ, F | | | | | c — | d — | | | g — | h — | |
| REJ, $\overline{P/F}$ | | | | | c — | d — | | | g — | h — | |
| REJ, P | | | g 012 | h 012 | g 012 | h 012 | | | | | |
| SABM | b 001 | | b 007 | b 007 | b 007 | b 007 | | | | | |
| DISC | | | k 008 | k 008 | k 008 | k 008 | | | | | |
| DM | | | a 009 | a 009 | a 009 | a 009 | | | | | |

STATUS SYMBOL a,b,··· AFTER TRANSITION
O: ORIGINAL STATUS
TASK NO. TO BE EXECUTED (FIG. 20)
— : NO PROCESSING

DISREGARD THIS STATUS TRANSITION FACTOR

FIG. 20

TASK LISK

| TASK NO. | COUNTER RENEWAL | OTHER PROCESSING |
|---|---|---|
| 001 | $V(S) \leftarrow 0, V(R) \leftarrow 0,$ $L \leftarrow 0, \overline{O} \leftarrow 0$ | UA-SENDING REQUEST |
| 002 | | UA SENDING<br>NOTIFY HIGHER LAYER OF DATA SENDING READY |
| 003 | $V(S) \leftarrow V(S)+1, \overline{O} \leftarrow \overline{O}+1$ | I SENDING<br>REMOVE IF RR-SEND REQUEST EXISTS |
| 004 | | RR SENDING |
| 005 | $V(R) \leftarrow N(S)+1, C \leftarrow C+1,$ $L \leftarrow N(R), O \leftarrow V(S)-N(R)$ | RR-SENDING REQUEST IF C=2 AFTER COUNTER RENEWAL<br>RR-SENDING REQUEST UPON RECEPTION OF P=1<br>NOTIFY HIGHER LAYER OF DATA RECEPTION |
| 006 | $L \leftarrow N(R), \overline{O} \leftarrow V(S)-N(R)$ | RR-SENDING REQUEST UPON RECEPTION OF P=1 |
| 007 | $V(S) \leftarrow 0, V(R) \leftarrow 0,$ $L \leftarrow 0; \overline{O} \leftarrow 0$ | UA SENDING REQUEST<br>NOTIFY HIGHER LAYER OF MODE RESETTING |
| 008 | | UA SENDING REQUEST |
| 009 | | NOTIFY HIGHER LAYER OF COMMUNICATION END |
| 010 | | RECEPTION I FRAMES DISCARD<br>RR-SENDING REQUEST |
| 011 | | UA SENDING<br>NOTIFY HIGHER LAYER OF COMMUNICATION END |
| 012 | | RR-SENDING REQUEST |

PACKET COMMUNICATION PROCESSING METHOD

BACKGROUND OF THE INVENTION

The present invention relates to a packet communication processing method and, more particularly, relates to a packet communication processing method which is simple in data link layer processing and which is little in processing delay as well as in end-to-end delay.

As a conventional connection type data link layer processing system, there has been used an LAPB procedure as described in CCITT (the International Telegraph and Telephone Consultative Committee) RED BOOK Recommendations X. 25. The LAPB procedure is a subset of the world-widely used HDLC procedure. A conventional data link layer protocol such as the LAPB procedure is a protocol which has been decided, in times of a high circuit-error probability, so as to perform communication securely between adjacent apparatuses through error re-sending or the like for the purpose of performing high-reliable data communication even under the condition of such a high circuit-error probability. Being complex in control to be conducted, the protocol is, in most cases, processed by means of software for the double purpose of updating the details of the protocol and absorbing differences between options employed. The conventional apparatus, in which processing is made by means of software, requires a delay time of several to tens of msec. for performing processing of one I (information) frame. In the case where communication is made through a communication network constructed by such conventional apparatuses, the delay time required for processing in a communication apparatus more increases when the processing is performed through several stages of relay circuits. Further, in a communication apparatus which relays a large number of circuits or high-speed circuits, a high processor performance is required for improvement of throughput. There has been therefore a proposal that a simple network protocol not according to X. 25 is used and error re-sending is performed between end-to-end (for example, as described in Technical Report IN88-56 of the Institute of Electronics Information and Communications of Japan), on the background of development of a high circuit speed and a low error probability.

The known LAPB procedure relating to the present invention will be described hereunder with reference to FIGS. 1, 2, 3 and 4. The drawings are sequence diagrams in the case where both an A-station 7 and a B-station 8 obey the LAPB procedure.

FIG. 1 is a sequence diagram for explaining the I frame N(S) check, the I frame re-sending and the timer supervision. In FIG. 1, the initial value of a reception status variable V(R) 9 in the A-station 7 is zero. The B-station 8 sends to the A-station 7 an I frame I(0,0) 401 which is a frame having a sending sequence number N(S)=0 and a receiving sequence number N(R)=0. Although description in this specification shows the case where all the sequence numbers and status variables are to be subjected to addition by modulo-8, the technique may be similarly applied to the case of modulo-128. Upon reception of the I frame I(0,0) 401, the A-station 7 checks the sending sequence number N(S)=0 of the received frame, recognizes that the received I frame I(0,0) is a correct one by the fact that the sending sequence number N(S)=0 of the received frame is equal to the reception status variable V(R)=0 in the A-station 7, and then updates the reception status variable V(R)=0 by one into V(R)=1. Then, the B-station 8 sends to the A-station 7 another I frame I(1,0) 402 which is a frame having a sending sequence number N(S)=1 and a receiving sequence number N(R)=0. Upon reception of the I frame I(1,0) 402, the A-station 7 checks the sending sequence number N(S)=1, recognizes that the received I frame I(1,0) is a correct one by the fact that the sending sequence number N(S)=1 of the received frame is equal to the reception status variable V(R)=1 in the A-station 7, and then updates the reception status variable V(R)=1 by one into V(R)=2. Assume that, although the B-station 8 similarly sends a further I frame I(2,0) 403, the I frame is lost before it reaches the A-station 7. Then, the B-station 8 sends a still further I frame I(3,0) 404. Upon reception of the I frame I(3,0) 404, the A-station recognizes the missing of the I frame I(2,0) 403 based on the fact that the sending sequence number N(S)=3 in the received I frame I(3,0) 404 is not equal to the reception status variable V(R)=2. The A-station 7 puts the reception status variable V(R)=2 of the A-station 7 into the receiving sequence number N(R) of a frame of REJ(2) 405 and sends the REJ(2) 405 to the B-station 8. The frame of REJ(2) 405 is a frame for requesting the re-sending of frames of I having the sending sequence number N(S)=2 et seq. Thereafter, the B-station 8 sends the I frames of from I(2,0) 406 to I(7,0) 411. The A-station 7 updates the reception status variable V(R) 9 one by one whenever one I frame is received, so that the reception status variable V(R) becomes zero after reception of the I frame I(7,0) 411. Assuming that the sending window size in the B-station 8 is six, the B-station 8 stops sending regardless of existence of any frame to be sent after the sending of the I frame I(7,0) 411 and waits for updating of the sending window by the receiving sequence number N(R) in the frame received from the A-station 7. The LAPB procedure has a rule that a timer is started whenever one I frame is sent. According to this rule, the B-station 8 starts the timer also after the sending of the frame of I(7,0). The B-station 8 stops the timer thereafter when a new frame is received from the A-station 7. However, the B-station 8 sends to the A-station 7 an RR frame 412 having a P bit set to "1" when the timer is over before the B-station receives the new frame from the A-station 7. Upon reception of the RR frame 412, the A-station 7 puts the status variable V(R)=0 into the receiving sequence number N(R) of an RR frame 413, sets the F bit of the RR frame 413 to "1" and sends the RR frame 413 to the B-station 8. The B-station 8 can update the sending window in response to the reception of the RR frame 413 and, further, can send frames of I(0,0) 414 et seq.

FIG. 2 is a sequence diagram for explaining the usage of F/P bit in the conventional apparatus. After the A-station sends a frame 801 having the P bit=1, the A-station 7 changes the inner status P-Sent to "Yes" for expressing the fact that the A-station 7 is ready for receiving a frame having the F bit=1 after the sending of the frame having the P bit=1 and stores the sending status variable V(S) of the A-station in the inner variable J serving as a sending status variable when the P bit is sent. The A-station 7 does not send the frame having the P bit=1 again while the inner status P-Sent shows "Yes". The B-station 8 sends a frame 802 having the F bit=1 in response to the reception of the frame 801 having the P bit=1. Upon reception of the frame 802 having the F bit=1, the A-station 7 resets the inner status P-Sent to "No". Under the conditions that the receiving sequence number N(R) is not less than the oldest unconfirmed sending status variable L in the A-station 7, not larger than the sending status variable V(S) and the less than the inner status variable J and the B-station 8 is not busy, the A-station 7 starts sending of the I frame having the sending sequence number N(S) equal to the receiving sequence number N(R), et seq. The oldest unconfirmed sending status variable L means the sending sequence number N(S) of the oldest one of frames which had been sent but the reception thereof by the other station had not been confirmed yet.

FIG. 3 is a diagram for explaining the operation in a disconnected phase. Upon reception of a frame having the P bit=1 other than SABM (set asynchronous balanced mode) frames in the disconnecting phase, the A-station 7 sends a DM (disconnected mode) frame to the B-station 8 to notify the B-station of the fact that the A-station is in a disconnected phase.

FIG. 4 is a diagram for explaining the procedure of processing when a busy state occurs The busy state occurs in the case where the communication apparatus for processing the data link layer cannot temporarily continue reception of I frames by inner limitation such as reception buffer limitation. In the A-station 7, the busy state occurs after the reception of the frames of I(0,0) 1401 and I(1,0) 1402. Upon occurrence of such a busy state in the A-station, the A-station 7 sends an RNR frame 1403. Upon reception of the RNR frame 1403, the B-station immediately stops the sending of I frames. When the busy state in the A-station 7 is removed, the A-station 7 sends an RR frame 1404 to the B-station 8 to notify the B-station of the fact that the busy state is removed. Upon reception of the RR frame 1404, the B-station re-starts the sending of I frame (1405 and 1406).

As described above, the conventional apparatus is configured so that when one station performs a processing according to a certain procedure, the other station performing communication with the one station also performs the same processing as the one station.

SUMMARY OF THE INVENTION

Because packet switches and terminals obeying conventional communication protocol such as HDLC still exist even though a superspeed packet network appears as described above, a configuration is required to connect the conventional packet switches and terminals to the superspeed packet network. The configuration will be explained with reference to FIG. 5.

In FIG. 5, reference numerals 1521 to 1525 designate superspeed packet switches each having a simple network protocol not according to X. 25. Reference numeral 1506 designates a superspeed packet switching network constructed by the superspeed packet switches 1521 to 1525. Reference numerals 1515 to 1520 designate conventional packet switches. Reference numerals 1501 to 1505 designate packet switching networks constructed by the conventional packet switches 1515 to 1520 and each having an interface according to X. 25, X. 75 or the like (data link layer processing protocol such as HDLC or other protocol similar to HDLC). Reference numerals 1507 to 1509 designate terminals each having the same interface as described above. Reference numerals 1510 to 1514 designate terminals connected to the packet switches.

Each of the packet switches in the conventional packet switching networks 1501 to 1505 performs a processing such as HDLC or other processings similar to HDLC as a data link layer (layer 2) processing for error control between the packet switch and an adjacent apparatus.

Each of the packet switching networks 1501 to 1505, terminals 1507 to 1509 and terminals 1510 to 1514 performs a processing such as HDLC or other processings similar to HDLC as a data link layer (layer 2) processing in the interface to the outside thereof.

Each of the superspeed packet switches in the superspeed packet switching network 1506 performs a high-speed processing according to the above-mentioned simple network protocol as a data link layer processing.

Further, considering that the terminals 1511 and 1513 perform communication with each other, end-to-end error control in the terminals 1511 and 1513 is carried out by a network layer (layer 3) or transport layer (layer 4) which is higher than the data link layer.

According to the present invention, a unit of information exchange in the higher layer (layer 3 or layer 4) is called a packet. The packet is grouped into two, one being an information packet, the other being a control packet. The information packet is constituted by information to be exchanged between end apparatuses, and control information (header), such as a sequence number and the like in the higher layer, added to the information. The control packet is simply constituted only by control information in the higher layer.

According to the present invention, a unit of information exchange in the data link layer is called a frame. The frame is grouped into two, one being an information frame, the other being a control frame. The information frame is constituted by the aforementioned packet and control information (header, trailer), such as a sequence number and the like in the data link layer. The control frame is simply constituted only by control information in the data link layer.

In the case where the packet switching network 1501 is to be connected to the superspeed packet switching network 1506, the superspeed packet switch 1521 requires such a data link layer processing that the packet switch 1516 can perform a processing such as HDLC or other processings similar to HDLC with no contradiction. If the superspeed packet switch 1521 faithfully performs a processing such as HDLC or other similar processings, the aforementioned delay time of from several to tens msec. is generated in the superspeed packet switch. Thus, there arises a problem in that the advantage of the superspeed packet switch which is less in delay time is defeated. The problem is severe particularly in the case where voice information is transferred.

Further, in the prior art, as shown in FIG. 1, a long sending break 417 may be produced from the point of time when the B-station 8 sends the I frame I(7,0) 411, that is, an I frame enabled to send through the sending window, to the point of time when the next I frame is enabled to send. There arises a problem in that continuous sending of I frames is suppressed to thereby increase the end-to-end delay time. Accordingly, there arises the same problem as described above in that the advantage of the superspeed packet switch which is less in delay time is defeated.

Further, in FIG. 1, the B-station 8 performs re-sending of I frames in response to the reception of the REJ frame 405. To make the re-sending possible, the B-station 8 has a buffer in the inside, to store temporarily all the frames to be sent and remove successively only the frames confirmed by the other station. In particular, in the case of modulo-128, the buffer capacity to be prepared may become so large as several Mbytes according to the maximum I frame length. As described above, there arises a problem in that a buffer is required for re-sending frames and, accordingly, a large quantity of hardware is required in the prior art.

Further, in the case where the aforementioned processing is mainly conducted by means of hardware in the conventional apparatus for the purpose of reduction of the delay time, status transition control hardware for performing complex control must be provided. There arises a problem in that the conventional apparatus is complex in logical circuits thereof.

It is therefore an object of the present invention to provide a packet communication processing method in which load in processing of the data link layer in an apparatus (one apparatus) for performing a communication with another apparatus (the other apparatus) performing a data link layer processing according to HDLC or other processings similar to HDLC (for example, SDLC (synchronous data link control) or LLC (logical link control)) is reduced with no contradiction with respect to the other apparatus to thereby make it possible to reduce the processing delay time in the one apparatus.

It is another object of the invention to provide a packet communication processing method in which a break of a continuous sending or receiving, caused by window control of I frames to be sent and received is reduced to thereby reduce the delay time in the other and one apparatus to thereby make it possible to reduce the end-to-end delay time.

It is also an object of the invention to provide a packet communication processing method in which the one apparatus is simply constructed with no buffer for resending and with no complex control circuit, to thereby make it possible to reduce the quantity of hardware in the one apparatus.

To attain the foregoing objects, in accordance with one aspect of the present invention, in one apparatus, that is to say, a communication apparatus for communication with the other apparatus, all the I frames are accepted by the communication apparatus, regarding the I frames as having been received normally regardless of the rightness of the sending sequence number N(S) in the received I frames; and the detection and recovery of the missing of frames are processed in the higher layer between end apparatuses. In this case, preferably, the number of reception of I frames are counted in the communication apparatus; an RR frame is sent to the other apparatus whenever the number of reception reaches a predetermined value, the receiving sequence number N(R) of the RR frame being set to a value obtained by addition of 1 (one) to the sending sequence number N(S) of the newest received I frame according to the modulo number. Alternatively, an RR frame is sent to the other apparatus whenever a predetermined time measured by a timer or the like is passed in the one apparatus, wherein each of the receiving sequence number N(R) of the RR frame and the receiving sequence number N(R) of a frame having the F bit=1 sent in response to the frame having the P bit=1 received from the other apparatus is set to a value obtained by addition of 1 (one) to the sending sequence number N(S) of the newest received I frame according to the modulo number and the receiving sequence number N(R) of other sent frames is set to a value equal to the receiving sequence number N(R) of the RR frame sent based on the timer or the sent frame having the F bit=1.

To attain the foregoing objects, according to another aspect of the invention, the last I frame in the window is sent after the P bit thereof is set to "1" without supervision of reception frames by the timer after the sending of I frames. In this case, preferably, the inner statuses of the communication apparatus before and after the sending of the frame having the P bit=1 are made equal.

According to a further aspect of the invention, communication is continued with no change regardless of the reception of the REJ frame from the other apparatus.

According to a further aspect of the invention, communication is continued with no change of the inner status of the one apparatus though I frames are disabled to receive.

According to the present invention, load in processing of the data link layer in the communication apparatus is reduced because all the I frames are accepted by the communication apparatus without checking the rightness of the sending sequence number N(S) in the I frames.

Further, the break of the continuous sending caused by the sending window control of I frames sent from the other apparatus is reduced because an RR frame is sent to the other apparatus whenever the counted number of I frame reception reaches a predetermined value.

If an RR frame is sent to the other apparatus whenever a predetermined time measured by a timer provided in the communication apparatus is passed, the break of the continuous sending caused by the sending window control of I frames sent from the other apparatus is reduced. Considering the case where all the data sent from the packet switching networks 1501-1503 and from the terminals 1507 and 1508 to the superspeed packet switch 1521 in the superspeed packet switching network 1506 in FIG. 5 are addressed to the packet switching network 1504 connected to the superspeed packet switch 1525, the superspeed packet switching network is apt to send data entering in the network to the destination as soon as possible because the buffer capacity in the network is established to be as small as possible, so that the superspeed packet switch 1525 is apt to send data to the packet switching network 1504 as soon as the data from the packet switching networks 1501 to 1503 and terminals 1507 and 1508 reach the superspeed packet switch 1525. In this case, data from a plurality of sources reach the packet switch 1520 at once, so that the data may be discarded in the packet switch 1520 or superspeed packet switch 1525 by shortage of processing capacity. According to the present invention, the rate of data entering into the superspeed switched network can be limited based on the set value of the timer in the superspeed switch (the one apparatus) (in the aforementioned example, the superspeed packet switch 1521) at which the data enters into the superspeed packet switching network, to thereby prevent discard of data in the destination side.

In the case where each communication apparatus does not carry out timer supervision after the sending of I frames, the processing load in the communication apparatus can be reduced. Further, in this case, the break of the continuous sending, caused by the sending window control of I frames sent from the one communication apparatus can be reduced by setting the P bit of the last sent I frame of the window to 1. Further, the number of inner statuses in the respective communication apparatus can be reduced by equally setting the statuses of the respective communication apparatus before and after the sending of the frame of P bit=1, to thereby reduce the quantity of hardware in the communication apparatus.

In the case where each communication apparatus carries out a mode resetting procedure or continues the same processing as that conducted before the reception of an REJ frame without processing of re-sending though the REJ frame is received from the other apparatus, the buffer to be provided for re-sending in each apparatus can be omitted. Further, in the case where each communication apparatus continues communication with no change of the inner status of the communication apparatus though the communication apparatus is so busy that I frames cannot be received temporarily, the number of inner statuses of the communication apparatus can be reduced to thereby reduce the quantity of hardware in the communication apparatus.

According to the present invention, error control is not carried out in the data link layer but is carried out in a higher layer of not less than the layer 3. This means that the time required for recovery after the production of one error is longer than that in the conventional processing. However, the rate of occurrence of errors is reduced by the improvement of circuit reliability. Further, the processing delay in the normal case is reduced by the reduction of processing load according to the present invention. Accordingly, the processing delay as a whole is smaller than that in the prior art.

BRIEF DESCRIPTION OF THE DRAWINGS

FIG. 18 is a view showing an example of the configuration of an apparatus to which the invention is applied;

FIGS. 19A and 19B are status transition tables in the case where the invention is applied; and FIG. 20 is a list of processing task designated in FIGS. 19A and 19B.

DESCRIPTION OF THE PREFERRED EMBODIMENTS

The preferred embodiments of the present invention will be described hereunder with reference to the drawings.

Figure 6:
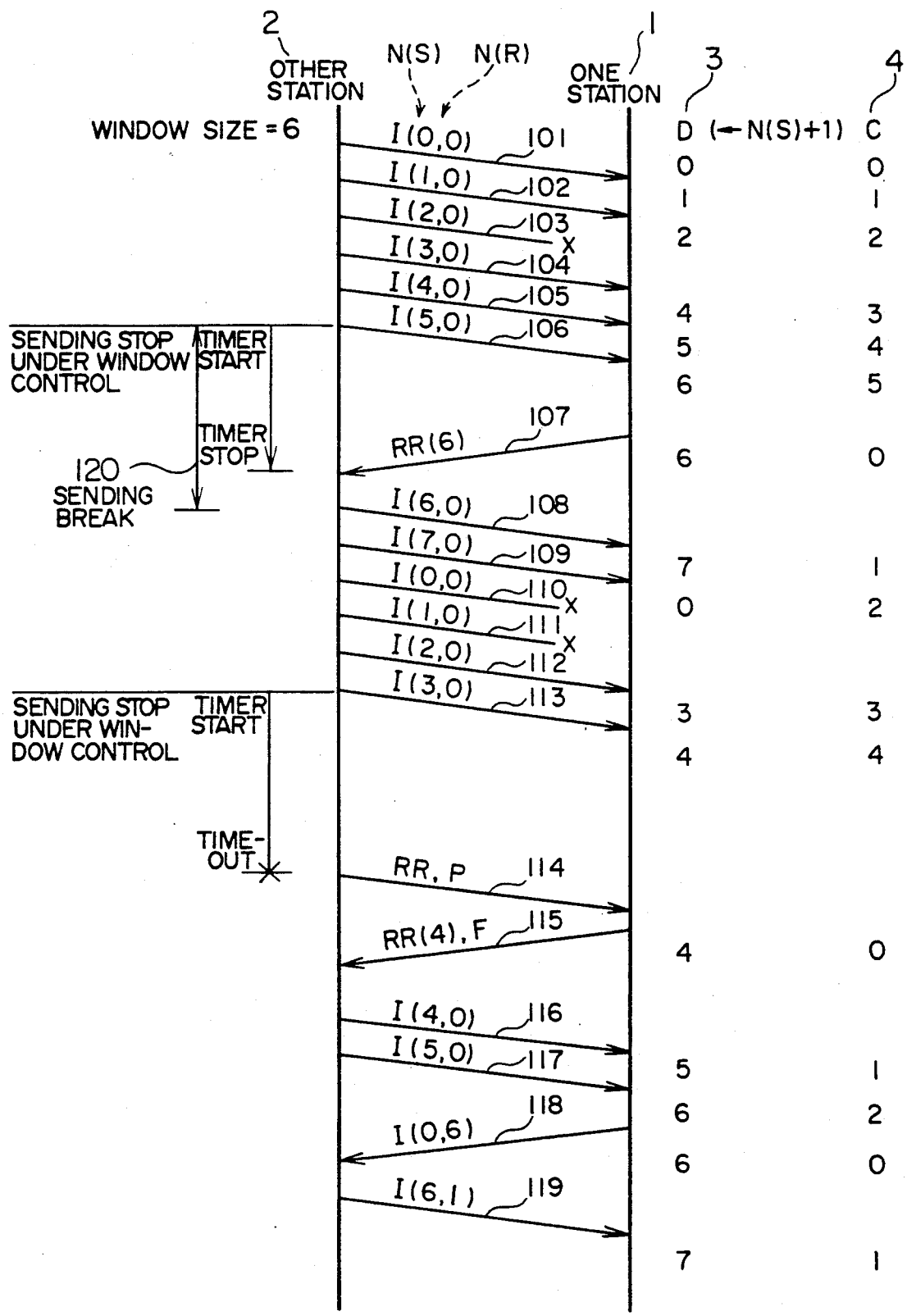
FIG. 6 is a view showing an embodiment of the procedure of data link layer processing in a packet communication method according to the present invention.

FIG. 6 is a sequence diagram for explaining the procedure of data link layer processing in a packet communication procedure according to an embodiment of the present invention.

In FIG. 6 reference numeral 1 designates one station (node) in which data link layer processing according to the packet communication method of the invention is performed and reference numeral 2 designates another station (node) in which processing according to conventional HDLC or the similar procedure is performed. The one station 1 corresponds to the superspeed packet switch 1521 in FIG. 5 and the other station 2 corresponds to the packet switch 1516 in FIG. 5. In this embodiment, the sending window size in the other station 2 is established to be six. The other station 2 sends six frames of I from I(0,0) 101 to I(5,0) 106 and then stops sending in accordance with window control. The one station 1 accepts and receives all the reception I frames with no conventional process of checking the rightness of the reception I frames based on comparison of the sending sequence number N(S) with the reception status variable V(R), thereby reducing the processing load.

Assume now that an I frame I(2,0) 103 is lost on a circuit. The missing of the frame cannot be found in the data link layer processing in the one station 1 but can be detected by processing in a higher layer because the missing of the packet is always supervised in a higher layer of end-to-end (for example, terminals 1511 and 1513). Thus, a procedure of recovering the missing frame can be carried out. The missing I frame is resent by a method as described in CCITT RED BOOK X. 25, 6.4. Reference numeral 3 designates an inner variable D contained in the one station 1. Whenever an I frame is received, a value obtained by addition of 1 (one) to the sending sequence number N(S) of the reception I frame is stored in D. Reference numeral 4 designates a counter C contained in the one station 1. Whenever an I frame is received, the counter is updated by 1 (one) to thereby count the number of received I frames. When the number of received I frames reaches a predetermined set value, an RR frame is sent. In this embodiment, the predetermined set value is 5. The counter C is updated to 5 after the one station 1 receives an I frame I(5,0) 106, so that the one station 1 sends the RR frame 107. The value of the inner variable D of 6 is stored as the receiving sequence number N(R) of the sent RR frame 107. The value of the receiving sequence number N(R) of each frame sent from the one station 1 is made to be equal to the value of the inner variable D given when the frame is sent. After the RR frame 107 is sent, the value of the counter C is reset to zero. Not only the value of the counter C is reset to zero through the sending of the RR frame issued whenever the predetermined number of I frames is counted by the counter, but also the value of the counter C is reset to zero after all the frames containing the receiving sequence number N(R) as information are sent. Although this embodiment shows the case where the counter C operating as described above is provided as means for counting the number of received I frames, the invention can be applied to the case where a counter having a predetermined set value to be reduced by one whenever an I frame is received may be provided to send the RR frame when the value of the counter becomes zero.

Figure 1:
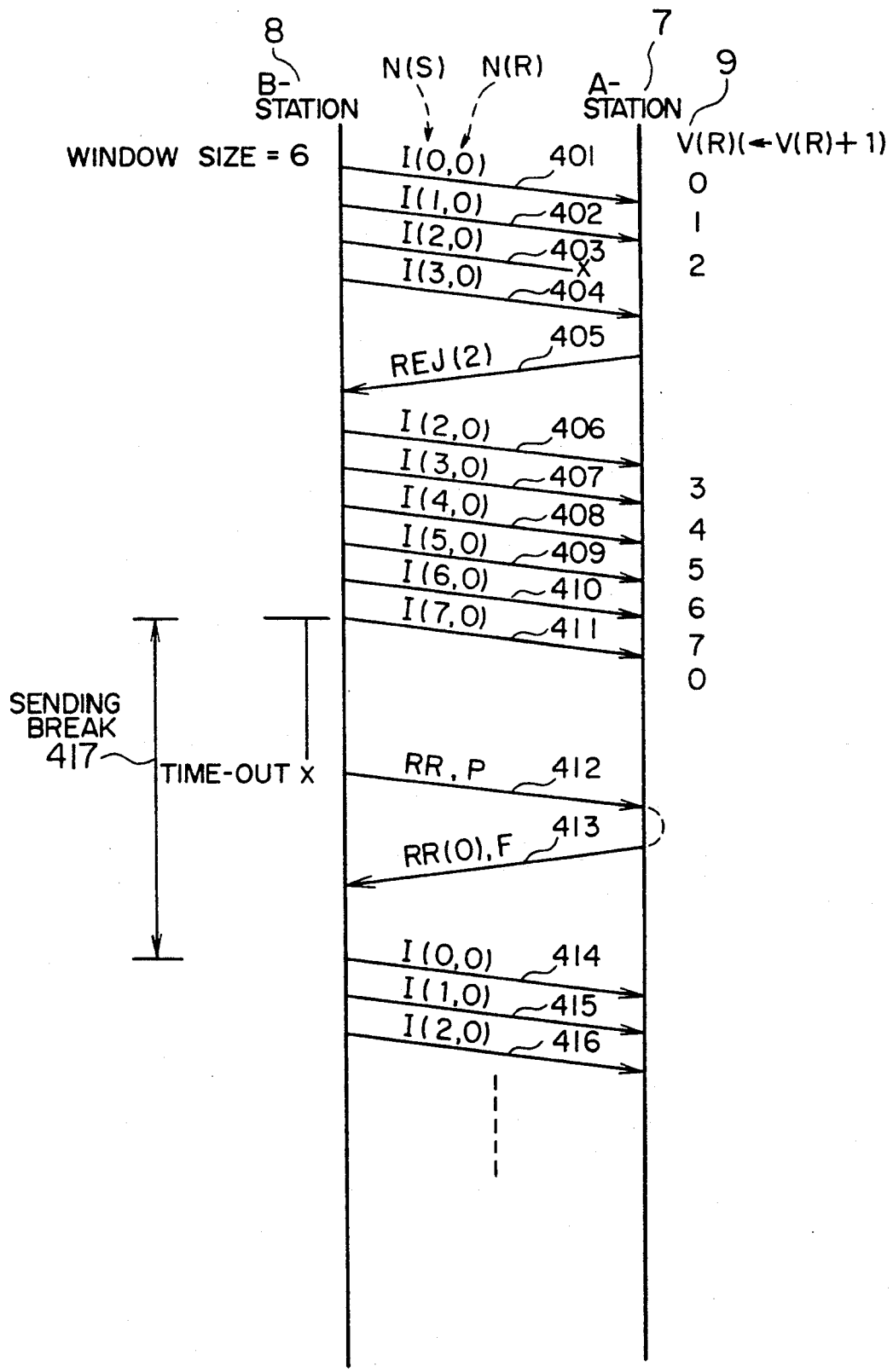
FIGS. 1, 2, 3 and 4 are sequence diagrams showing the procedure of conventional HDLC or the procedures similar to HDLC.

Upon reception of the RR(6) 107, the other station 2 stops the timer which had been started at the time of sending of the I frame I(5,0) 106, updates the window and sends further six frames of I(6,0) 108 to I(3,0) 113. Through the sending of the RR frame from the one station 1 based on the value of the counter C, the break of the continuous sending 120 of I frames sent from the other station 2 becomes shorter than the break of the continuous sending 417 in the case of the prior art as shown in FIG. 1.

The two I frames of I(0,0) 110 and I(1,0) 111 among the I frames I(6,0) 108 to I(3,0) 113 sent from the other station 2 are missing, so that the counter C cannot show the set value of 5 after the last I frame I(3,0) 113 is received by the one station 1. This is because there occurs the missing of I frames in a number larger than the value=1 which is the difference of (the window size=6 of the other station 2) - (the set value=5 of the counter C in the one station 1). In such a case, the other station 2 sends an RR,P frame 114 in response to the time-out in the other station 2. The one station 1 sends an RR(4),F frame 115 as a return, so that the other station 2 updates the sending window to make it possible to send frames I(4,0) 116 et seq. After having sent the RR(4),F frame 115, the one station 1 resets the value of the counter C to zero. Upon reception of the RR(4),F frame 115, the other station 2 updates the sending window and sends I frames I(4,0) 116 and I(5,0) 117. If a sending request is then given to the one station 1, the one station 1 sends an I frame I(0,6) 118 and resets the counter C. The other station 2 updates the sending window in response to the reception of the I frame I(6,1) 118 and sends I frames I(6,0) 119 et seq.

Even though the missing of I frames as shown in FIG. 6 occurs in the middle of sequencing, the data link layer processing can be continued normally. The I frames I(2,0) 103, I(0,0) 110 and I(1,0) 111 missing in the data link layer are recovered by the end-to-end re-sending in the packet layer or a higher layer.

The time required for the re-sending procedure in the higher layer is larger than the time required for the re-sending procedure in the data link layer. In practice, however, the occurrence of the missing of frames is not so frequent as described in this embodiment because recent circuits are improved in reliability, so that the average packet transmission delay time in end-to-end is reduced consequently.

Figure 5:
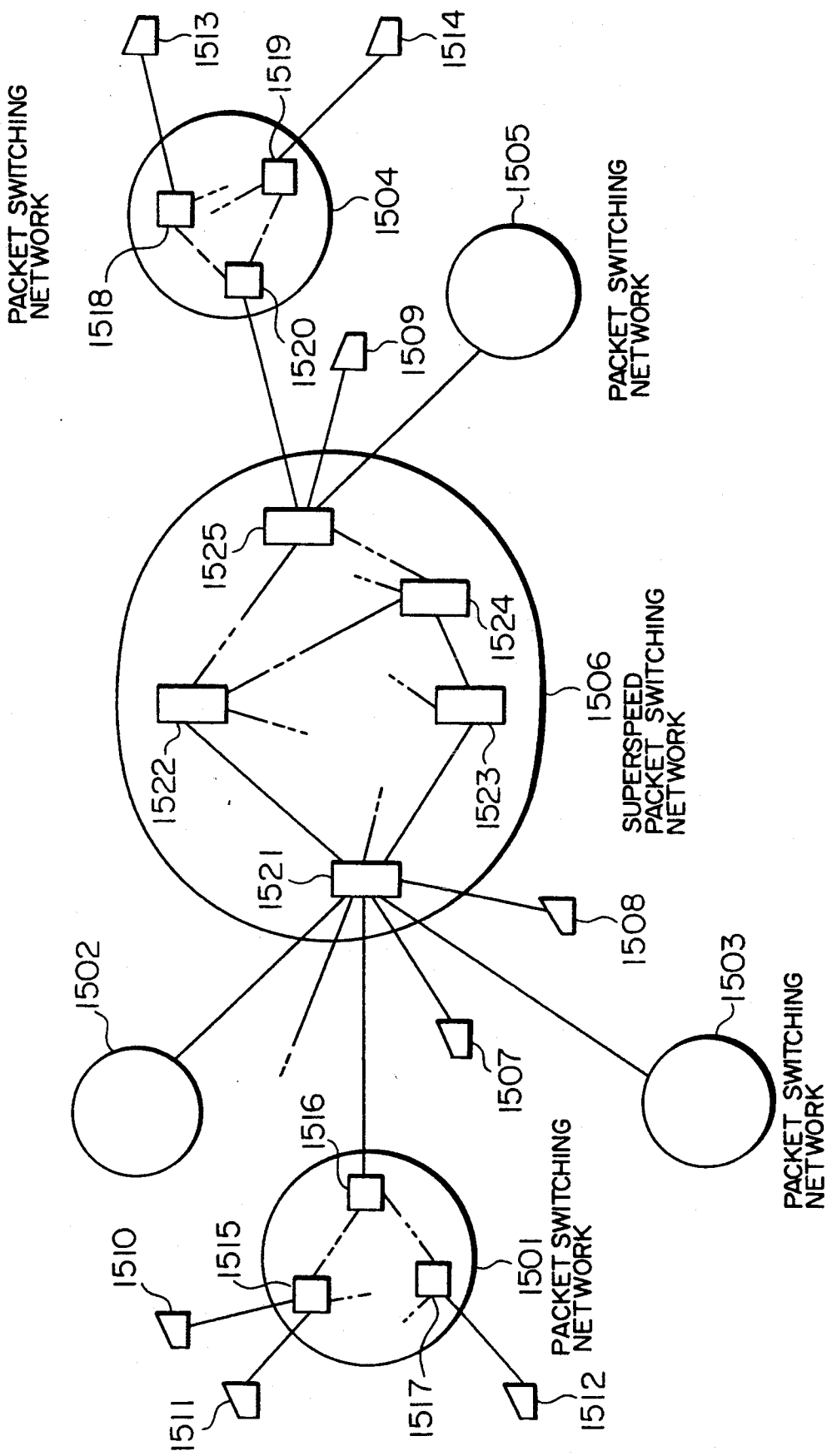
FIG. 5 is a view showing an example of the configuration of a network to which the present invention is applied.

The one station 1 in FIG. 6 corresponds to the superspeed packet switch 1521 in FIG. 5 and the other station 2 corresponds to the packet switch 1516. This is further shown in FIG. 7.

Figure 7:
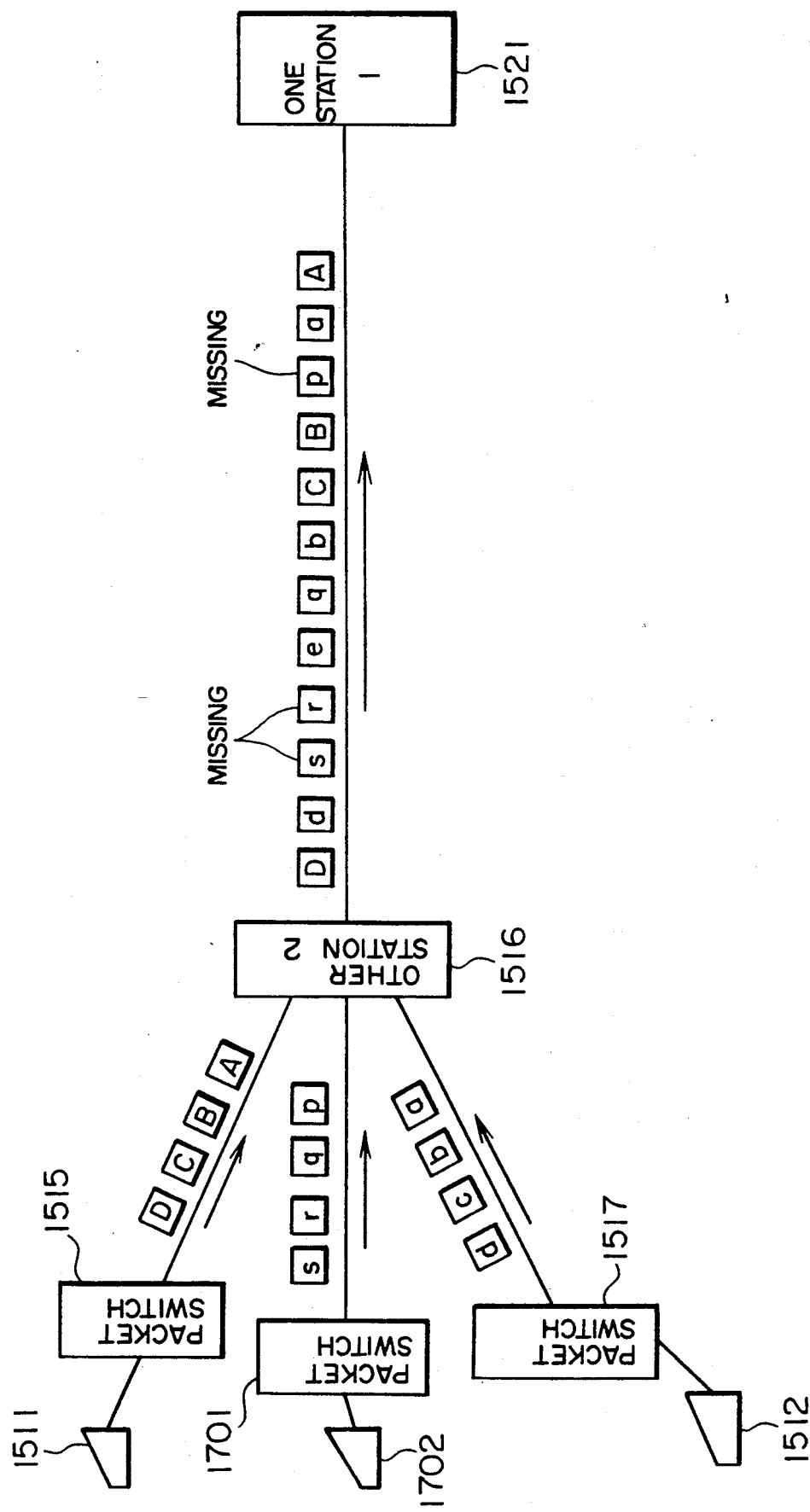
FIG. 7 is a view useful for explaining the re-sending of frames in a higher layer than the data link layer.

In FIG. 7, data to be sent to the superspeed packet switch 1521 (the one station 1) from the packet switch 1516 (the other station 2) are data sent from the terminals 1511, 1702 and 1512 connected to the packet switches 1515, 1701 and 1517 connected to the other station 2. The data are further sent to the end terminals (1513, 1514, etc., in FIG. 5) located in the right side of the one station 1. As shown in FIG. 7, in the case where frames p, r and s are missing between the other station 2 and the one station 1, the other station 2 side terminal needing the end-to-end re-sending procedure is only one terminal 1702, so that the re-sending procedure for the terminals 1511 and 1512 is not required.

In the following, error recovery is explained with reference to FIG. 8.

Figure 8:
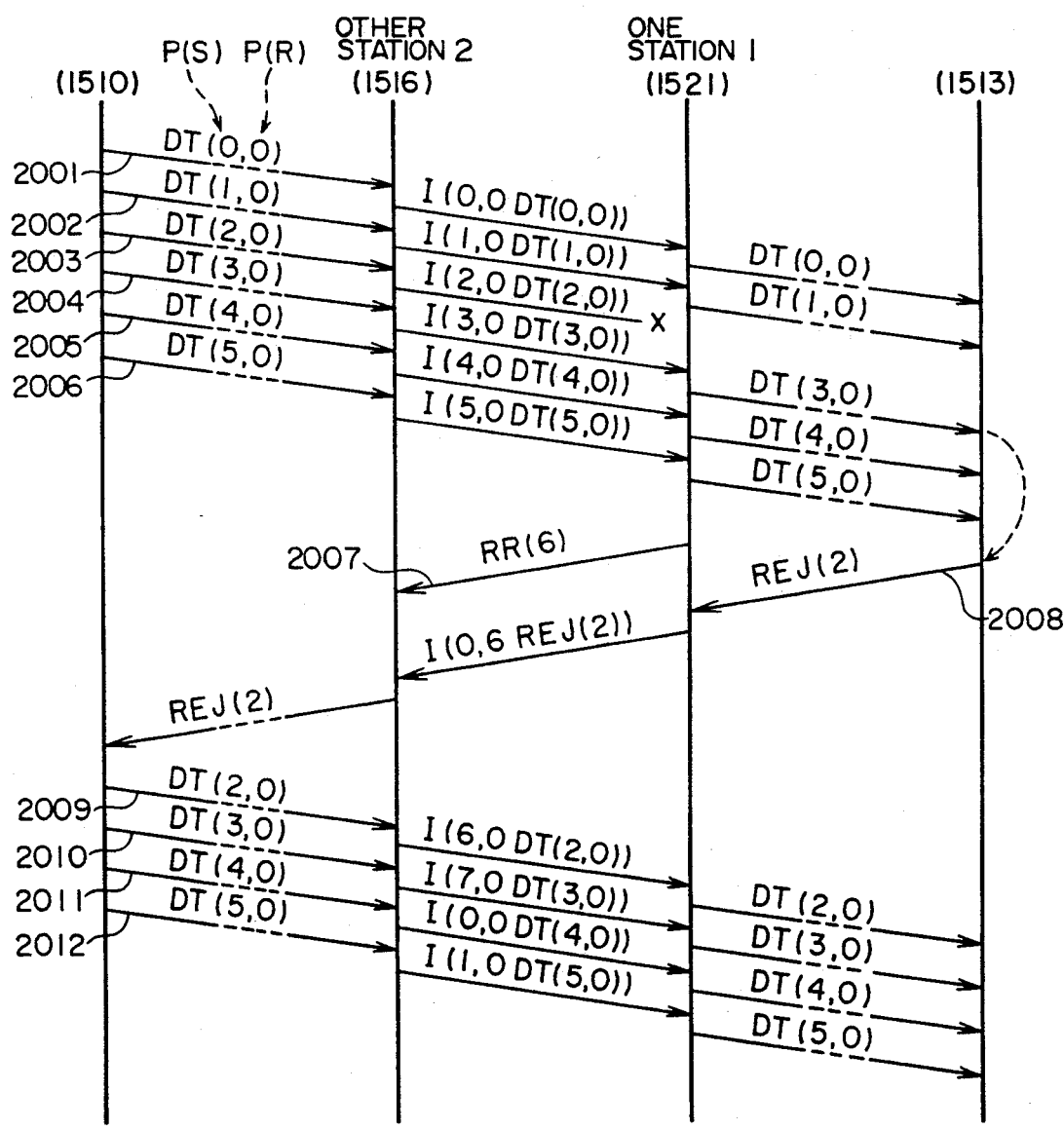
FIGS. 8 and 9 are sequence diagrams each showing an example of end-to-end error recovery.

FIG. 8 is a sequence diagram showing an example of end-to-end error recovery. Reference numerals 1510 and 1513 designate the terminals shown in FIG. 5, 1516 designates the packet switch shown in FIG. 5, and 1521 designates the superspeed packet switch shown in FIG. 5. Reference numeral 1516 corresponds to the other station 2 in FIG. 6, and 1521 corresponds to the one station 1 in FIG. 6. In FIG. 8, a network layer is considered as a higher layer. The terminal 1510 sends data packets DT(0,0) 2001 to DT(5,0) 2006 of the network layer to the packet switch 1516. In a data packet DT(P(S),P(R)), P(S) represents the sending sequence number in the network layer, and P(R) represents the receiving sequence number in the network layer, these numbers having the same meaning between the terminals 1513 and 1516 as the sending sequence number N(S) and the receiving sequence number N(R) in HDLC. Though not shown, the processing of the data link layer is carried out between respective adjacent nodes (for example, between the terminal 1510 and the packet switch 1515) in transference from the terminal 1510 to the packet switch 1516. This fact can be applied to the side of the terminal 1513. Upon reception of the packets 2001 to 2006, the packet switch 1516 adds data link layer sequence numbers to the packets numbers, respectively, and sends the packets I(0,0 DT(0,0)) through I(5,0 DT(5,0)) to the superspeed packet switch 1521. For example, I(a,b DT(A,B)) represents an I frame of the data link layer obtained by addition of the data link layer sequence number N(S)=a and the receiving sequence number N(R)=b to the network layer packet DT(A,B). Assume now that the I frame I(2,0) is missing as in the case of FIG. 6. The superspeed packet switch 1521 sends the received packets for the terminal 1513. These packets pass through the superspeed packet networks 1506 and the packet network 1504 and reach the terminal 1513. Upon reception of the data packet DT(3,0), the terminal 1513 supervising the sending sequence number P(S) of received packets detects the missing of the data packet DT(2,0) 2003 and issues an REJ(2) packet 2008 of the network layer. A network layer REJ(P(R)) packet used herein is a packet for requesting the re-sending the packet having the sending sequence number P(S) equal to the receiving sequence number P(R) et seq., in the same manner as the data link layer REJ frame. Upon reception of the REJ(2) packet 2008, the terminal 1510 re-sends the data packets DT(2,0) 2009 to DT(5,0) 2012. Thus, the error caused by the missing of the frame between the other station 2 and the one station 1 is recovered.

Figure 9:
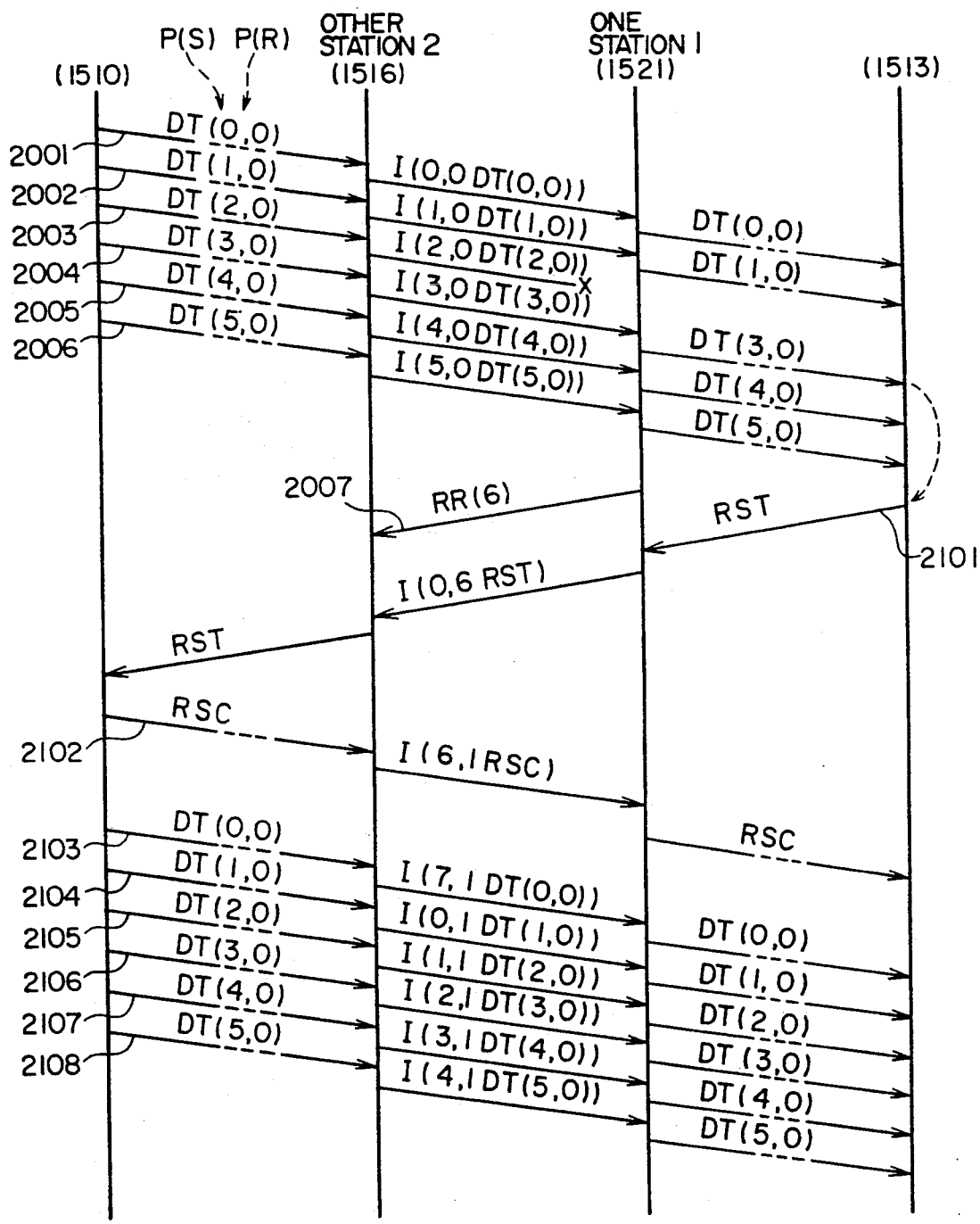

FIG. 9 is a sequence diagram showing error recovery in the case where the network layer in the terminals 1510 and 1513 does not support the REJ packet. Similarly to the case shown in FIG. 8, assume that the terminal 1510 sends the data packets DT(0,0) 2001 to DT(5,0) 2006, and the I frame I(2,0 DT(2,0)) is missing between the other stations 2 and the one station 1. Upon reception of the data packet DT(3,0), the terminal 1513 detects the missing of the data packet DT(2,0) and sends a reset request packet RST 2101. This reset request packet RST 2101 is converted into a reset instruction packet in the packet switching network 1501 connected to the terminal 1510 and then is sent to the terminal 1510. Upon reception of the reset instruction packet, the terminal 1510 sends a reset confirmation packet RSC if resetting can be made. When the packet RSC 2102 reaches the terminal 1513, the end-to-end connection between the terminals 1510 and 1513 is newly restarted, so that the terminal 1510 re-sends the same data packets DT(0,0) 2103 to DT(5,0) 2108 as the data packets DT(0,0) 2001 to DT(5,0) 2003. Thus, the error caused by the missing of the frame between the other station 2 and the one station 1 is recovered.

Although FIGS. 8 and 9 show the case where the missing of the packet is detected by the destination end apparatus 1513, the invention can be applied to the case where the source end apparatus 1510 conducts timer supervision to send a receive-ready (RR) packet when time-out occurs, so that the missing of the packet can be detected from information carried by an answer packet in response to the RR packet.

Figure 10:
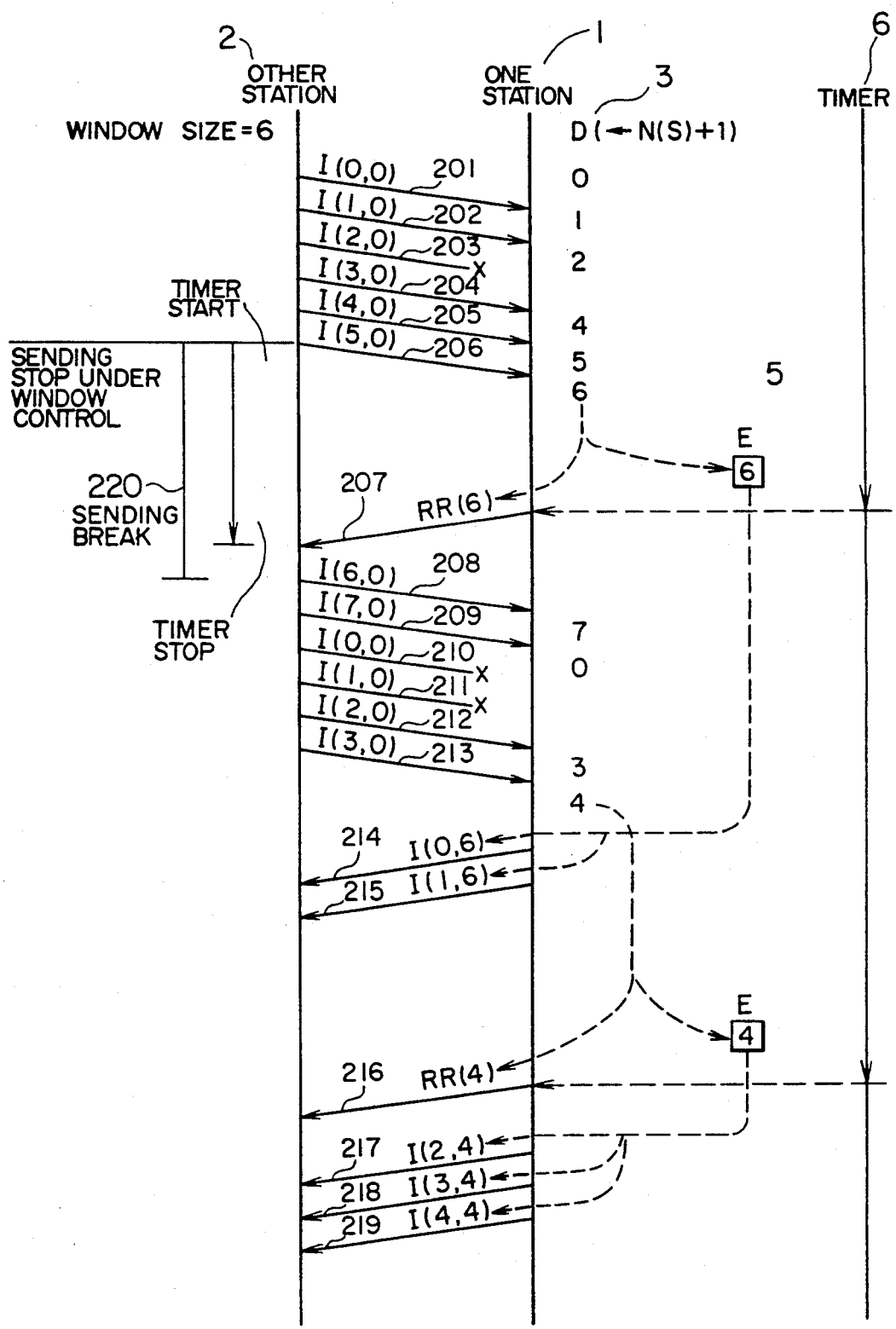
FIGS. 10 through 17 and FIG. 21 are sequence diagrams each showing another embodiment of the procedure of data link layer processing in the packet communication method according to the invention.

FIG. 10 is a sequence diagram showing another embodiment of the data link layer processing according to the packet communication method of the present invention.

In FIG. 10, the other station 2 sends six I frames I(0,0) 201 to I(5,0) 206 in the same manner as shown in FIG. 6 and then stops sending under the window control. The one station 1 receives and accepts all the reception I frames without checking the rightness of the sending sequence number N(S). Though the I frame I(2,0) 203 is missing, the one station 1 cannot detect the missing thereof. The inner variable D designated by the reference numeral 3 is the same as in FIG. 6. Whenever an I frame is received, a value obtained by addition of 1 (one) to the sending sequence number N(S) of the reception I frame is stored in the inner variable D. Reference numeral 6 designates a timer contained in the one station 1. Whenever a predetermined period measured by the timer is passed, the one station 1 sends an RR frame to the other station. In FIG. 10, the RR frame 207 is being sent. The one station 1 can set the predetermined period of the timer to a desired value. The receiving sequence number N(R) of the RR frame 207 is made to be set to the value (=6) of the inner variable D at the time of sending of the RR frame. In the case where the RR frame is sent based on the timer as described above, the value (=6) of the inner variable D at the time of sending of the RR frame is stored in another inner variable E designated by the reference numeral 5. Upon reception of the RR(6) frame 207, the other station 2 stops the timer started at the time of sending of the I frame I(5,0) 206, updates the window and sends further six I frames I(6,0) 208 to I(3,0) 213. Through the sending of the RR frame from the one station 1 based on the timer 6, the break of the continuous sending 220 of I frames sent from the other station 2 becomes shorter than the sending break 417 in the case of the prior art as shown in FIG. 1. In FIG. 10, though the I frames I(0,0) 210 and I(1,0) 211 are missing, the one station 1 does not notice the missing of those I frames, and thereafter upon the occurrence of a sending request, the one station 1 sends two I frames I(0,6) 214 and I(1,6) 215. The receiving sequence number N(R) of such spontaneously sent I frames is set to the value (=6) of the inner variable E at the time of sending of the I frames. Then, the one station 1 sends the RR frame 216 based on the timer 6. The receiving sequence number N(R) of the RR frame 216 is set to the value (=4) of the inner variable D at that time and further, the same value is stored in the inner variable E. Thereafter, the receiving sequence number N(R) of I frames 217, 218 and 219 sent from the one station 1 is set to the value (=4) of the inner variable E. The missing frames are detected and recovered in the end-to-end higher layer processing in the same manner as in the embodiment shown in FIG. 6.

Figure 11:
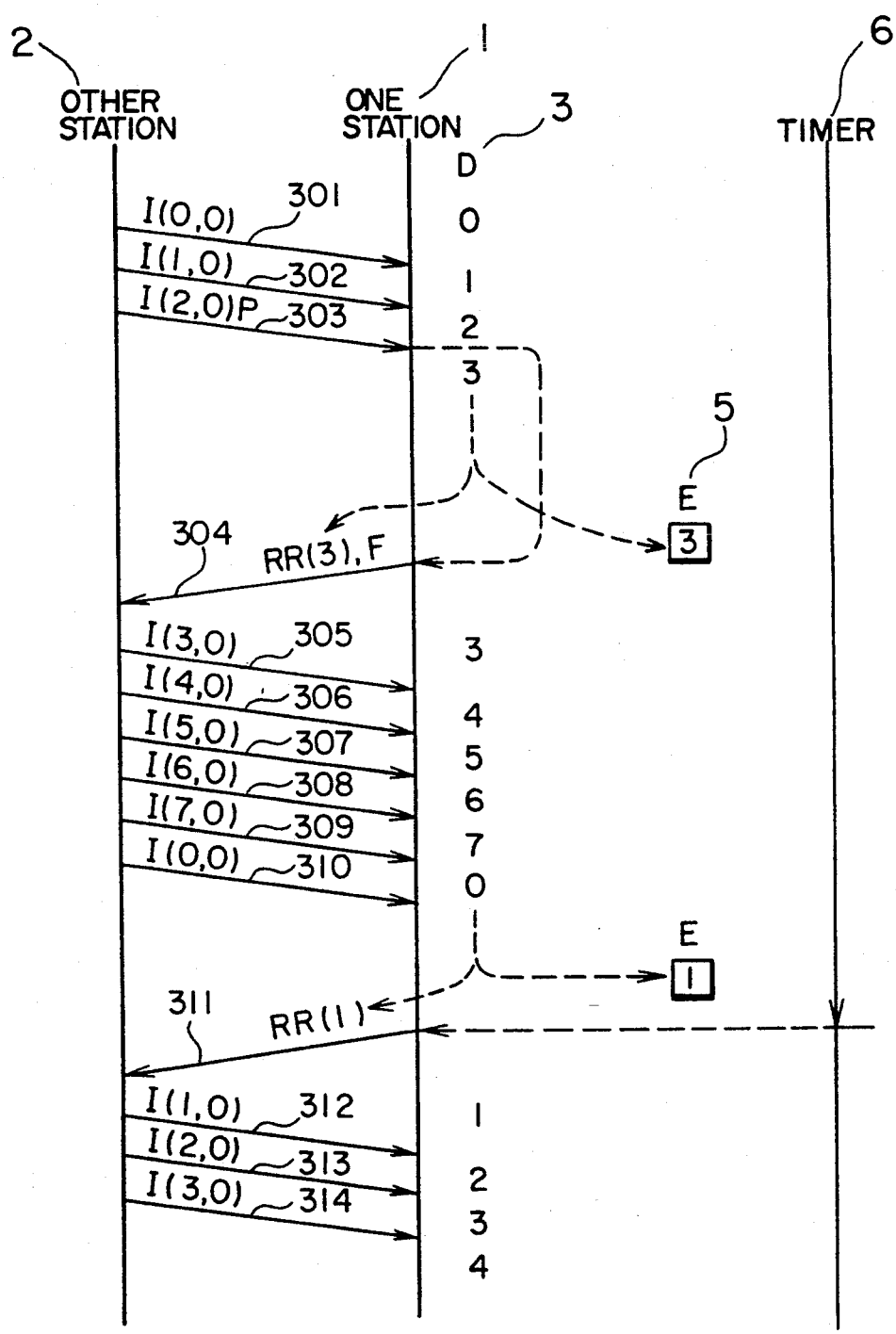

FIG. 11 is a sequence diagram showing a continuation from FIG. 10. The other station 2 sends three I frames 301, 302 and 303. The third I frame has the P bit set to "1". The one station 1 sends an RR frame 304 having the F bit of "1" in response to the reception having the P bit of the I frame 303. The receiving sequence number N(R) of the RR frame 304 is set to the value (=3) of the inner variable D and, at the same time, the value of the inner variable D is stored in the inner variable E. As described above, the one station 1 sets the receiving sequence number N(R) of the sent frame having the F bit=1 in response to the reception frame having the P bit=1 to be equal the value of the inner variable D and, at the same time, stores the value of the inner variable D in the inner variable E. Upon reception of the RR frame 304, the other station 2 updates the sending window and sends six I frames 305 to 310. The one station 1 sends an RR frame 311 based on the timer 6. Upon the reception of the RR frame 311, the other station 2 updates the sending window and sends I frames 312 et seq. By arbitrary adjusting the sending timing of the RR frame based on the timer 6 in the one station 1, the rate of frames entering into the superspeed packet switching network from the conventional packet switching network can be adjusted when the invention is applied to superspeed packet switches, so that discard of frames in the superspeed packet switching network can be prevented.

Figure 12:
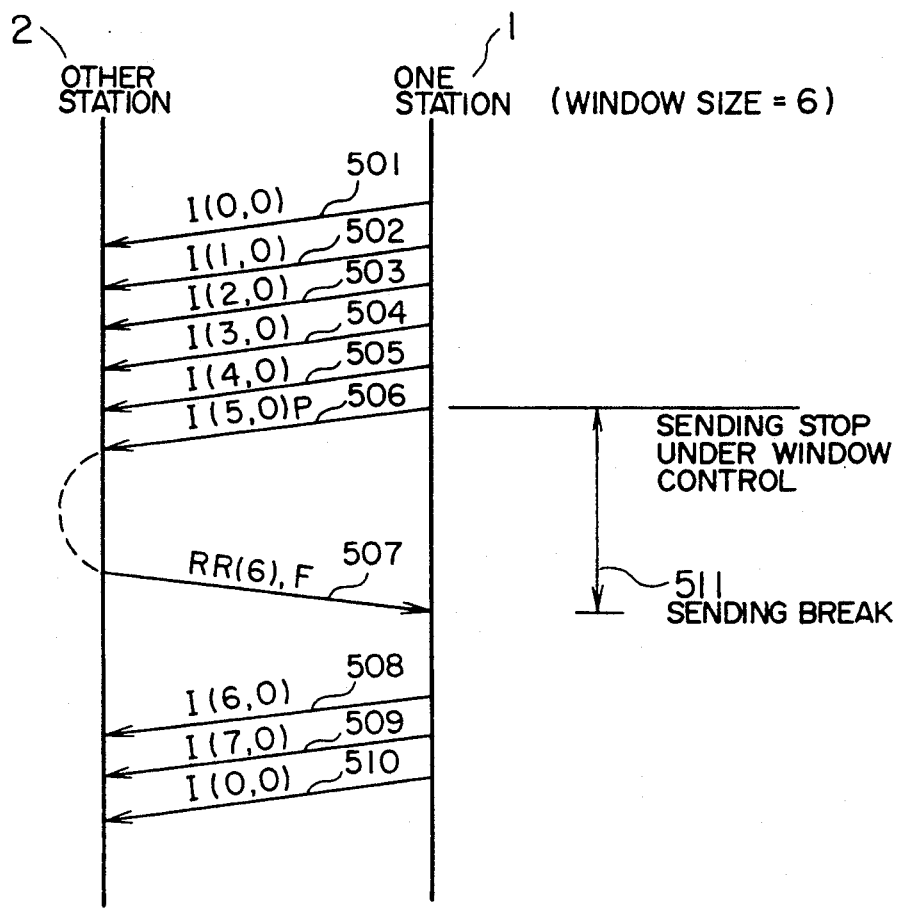

FIG. 12 is a sequence diagram showing a further embodiment of the data link layer processing procedure according to the packet communication method of the invention.

In FIG. 12, the one station 1 is configured not to conduct timer supervision in connection with the sending of I frames as described above in the prior art, to thereby reduce the processing load on the one station 1. Further, the P bit of the last sending I frame 506 of the window in the one station 1 is set to "1". The other station 2 sends an RR frame 507 having the F bit=1 as a return, so tat the break 511 of the continuous frame sending becomes shorter than the sending break 417 in the case of the prior art as shown in FIG. 1. Because the one station 1 in FIG. 12 does not conduct timer supervision after the sending of I frames, the end-to-end recovery procedure based on the supervision by the timer in the higher layer as to whether an expected answer comes back in a predetermined time or not is carried out in the case where the answer does not come in the predetermined time because of the missing of an I frame I(5,0),P 506 or other causes. However, the aforementioned trouble rarely occurs because recent circuits are improved in reliability.

Figure 13:
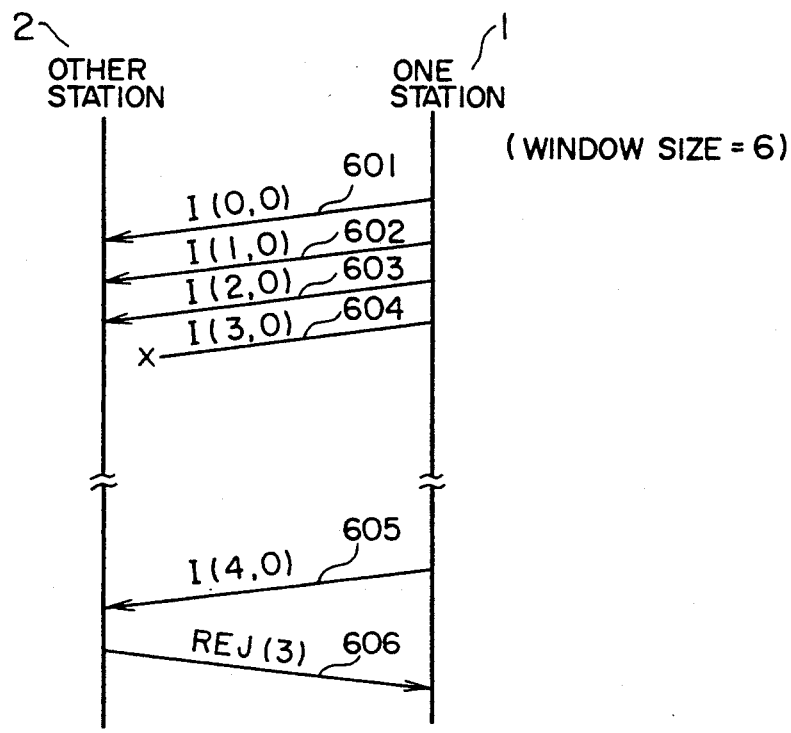

On the other hand, in the case where the one station 1 sends I frames in a number (for example, 4 (four) in FIG. 13) smaller than the window size and the last (fourth) I frame I(3,0) 604 is missing as shown in FIG. 13, the one station 1 cannot detect the missing thereof because the one station 1 does not conduct timer supervision. In such a case, error recovery is made as follows. When the one station 1 further sends frames, the other station 2 detects the missing of the I frame I(3,0) 404 upon the reception of the I frame I(4,0) 605 and sends the REJ(3) frame 606. When, on the other hand, the one station 1 does not send further frames any more, the end-to-end recovery procedure based on the timer supervision in the higher layer is carried out to solve the trouble.

Figure 14:
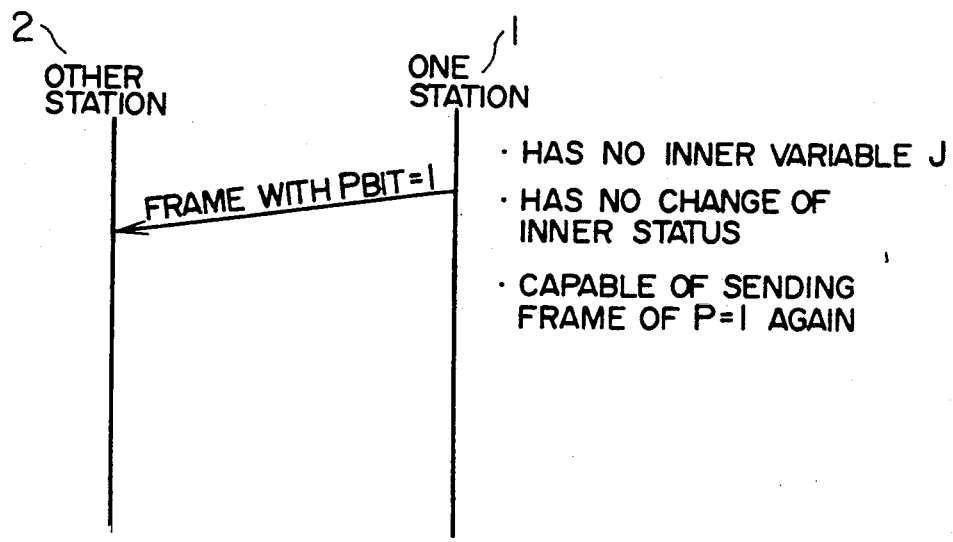

FIG. 14 is a sequence diagram showing a further embodiment of the invention.

Figure 2:
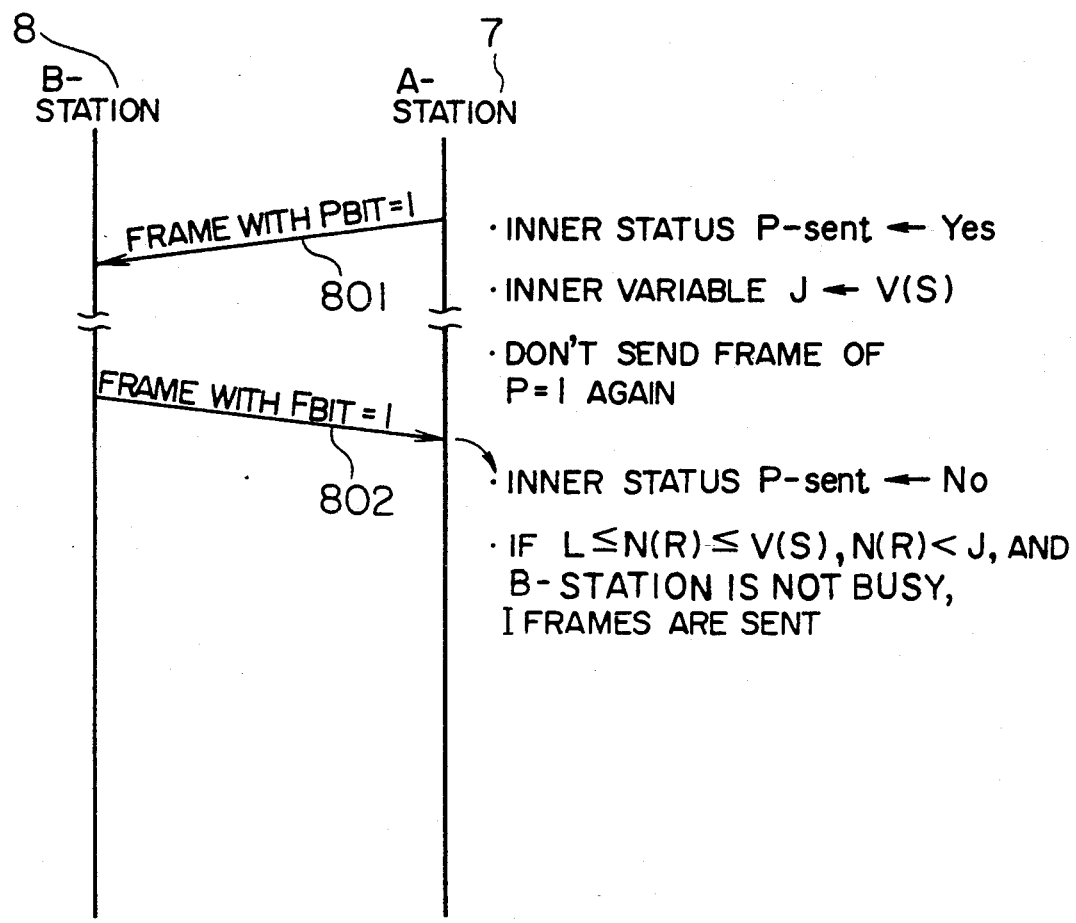
Figure 3:
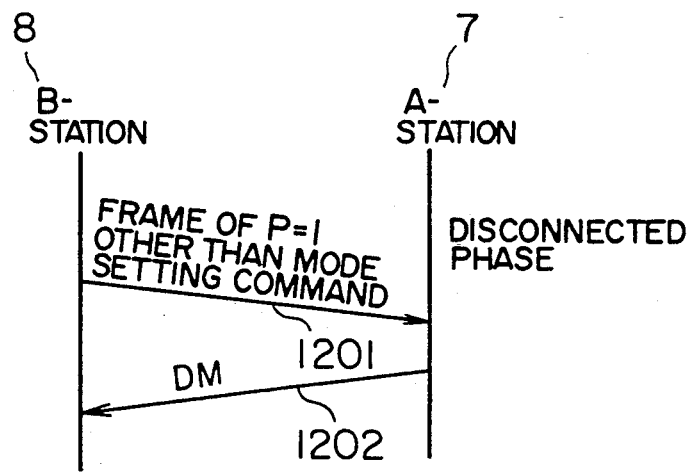

As described above, the procedure as shown in FIG. 2 has been used in the prior art based on the sending of the frame having the P bit=1 and the reception of the frame having the F bit=1 for the purpose of strictly checking erroneous sending and reception. In this invention, the inner variable J is omitted as shown in FIG. 14, the inner status does not change regardless of the sending of the frame having the P bit=1, and a plurality of frames having the P bit=1 can be sent at once, which reduce the number of inner statuses in the station 1 to simplify the processing in the one apparatus. For example, the frame having the P bit=1 according to the invention can be applied to the I frame I(5,0)P 506 shown in FIG. 12.

Figure 15:
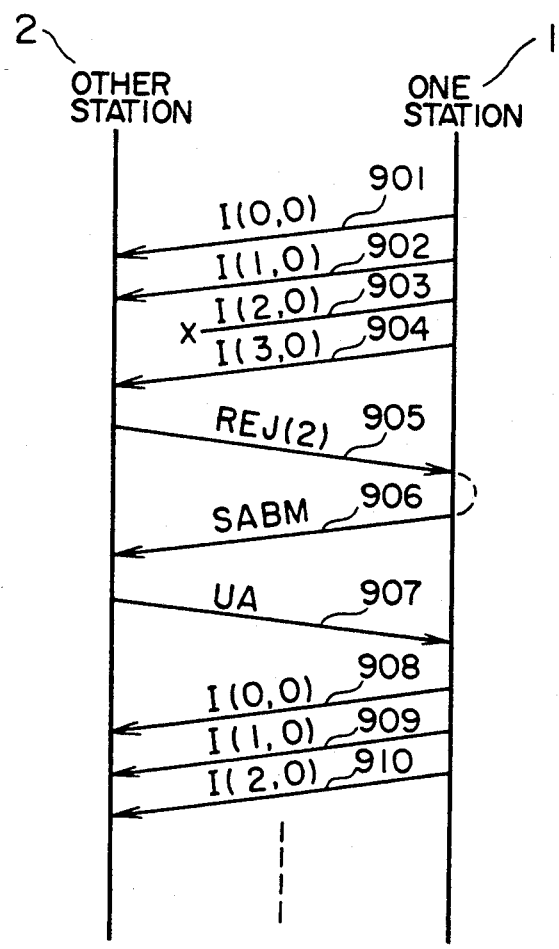

FIG. 15 is a sequence diagram showing a further embodiment of the data link layer processing in the packet communication method of the invention.

In the conventional apparatus in which a procedure such as HDLC or other procedures similar to HDLC is carried out, a buffer for re-sending I frames is required as described above with reference to FIG. 1 because the procedure of re-sending I frames is made when the REJ frame is received. In contrast thereto, re-sending is not carried out in this invention. Upon reception of an REJ frame 905 as shown in FIG. 15, the one station 1 carries out a procedure of mode resetting in which the one station 1 sends an SABM command 906 and then receives a UA frame 907. Then, the one station 1 newly restarts communication. The missing of I frame I(2,0) 903 is solved in the higher layer in the same manner as described above with reference to FIG. 6. In this embodiment, the re-sending of I frames is unnecessary for the one station 1, so that the one station 1 can be constituted without provision of the buffer for the re-sending.

Figure 16:
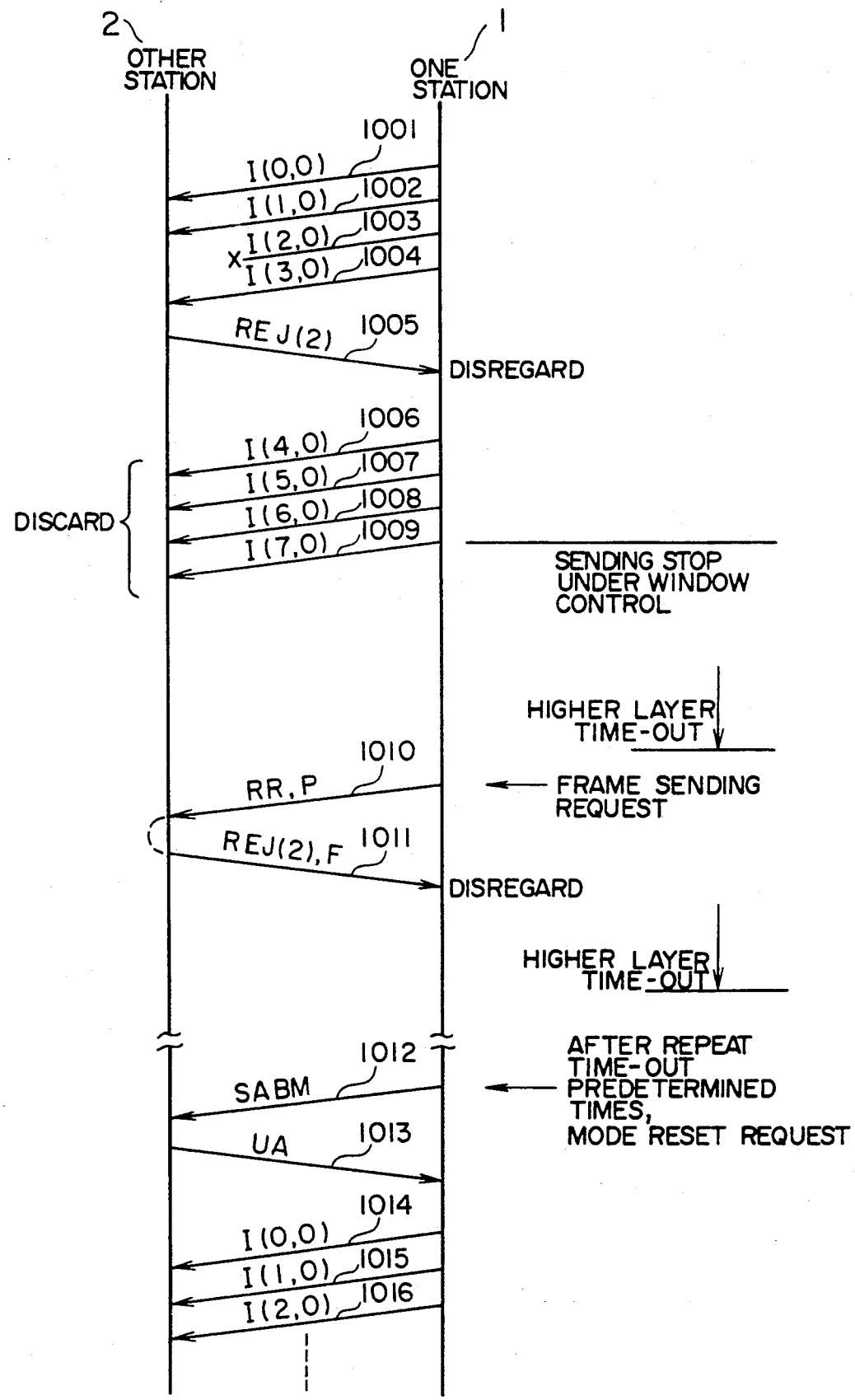

Alternatively, as shown in FIG. 16, the one station 1 continues communication with no change before and after reception of an REJ frame 1005. The one station 1 sends I frames I(4,0) 1006 to I(7,0) 1009 but the other station 2 discards them. If, as explained with reference to FIG. 12, the one station 1 does not conduct supervision of reception based on the timer, the one station 1 does not have to do anything in terms of the data link layer after the one station 1 stops the sending in accordance with the window control. In the higher layer, the timer in the higher layer becomes time-out when a frame to be sent is not sent in a predetermined time, so that the sending of I frames is requested for the data link layer. In the data link layer of the one station 1, the one station 1 cannot send I frames based on the window control, so that the one station 1 sends an RR,P frame 1010. The other station 2 sends an REJ(2),F frame 1011 in response to the reception of the RR,P frame 1010. The one station 1 neglects the REJ frame 1011 according to the present invention. Then, the higher layer issues a frame sending request whenever the timer becomes time-out. The one station 1 and the other station 2 repeats the same procedure as described above. After the higher layer repeats the time-out by a predetermined number of times, the higher layer issues a mode reset request to the data link layer. The one station 1 carries out the mode resetting procedure based on SABM in the same manner as shown in FIG. 15 and then restarts the sending of I frames.

In this embodiment, the time from the stopping of sending by the window control to the re-starting of sending is relatively long. However, the missing of frames hardly occurs because recent circuits are improved in reliability, so that the reception of the REJ frame hardly occurs. The aforementioned disadvantage, therefore, is almost neglected. The problem in the missing the I frame I(2,0) 1003 is solved in the higher layer in the same manner as described above with reference to FIG. 6. In this embodiment, the re-sending of I frames is unnecessary for the one station 1, so that the one station 1 can be configured without provision of the buffer for the re-sending.

Figure 17:
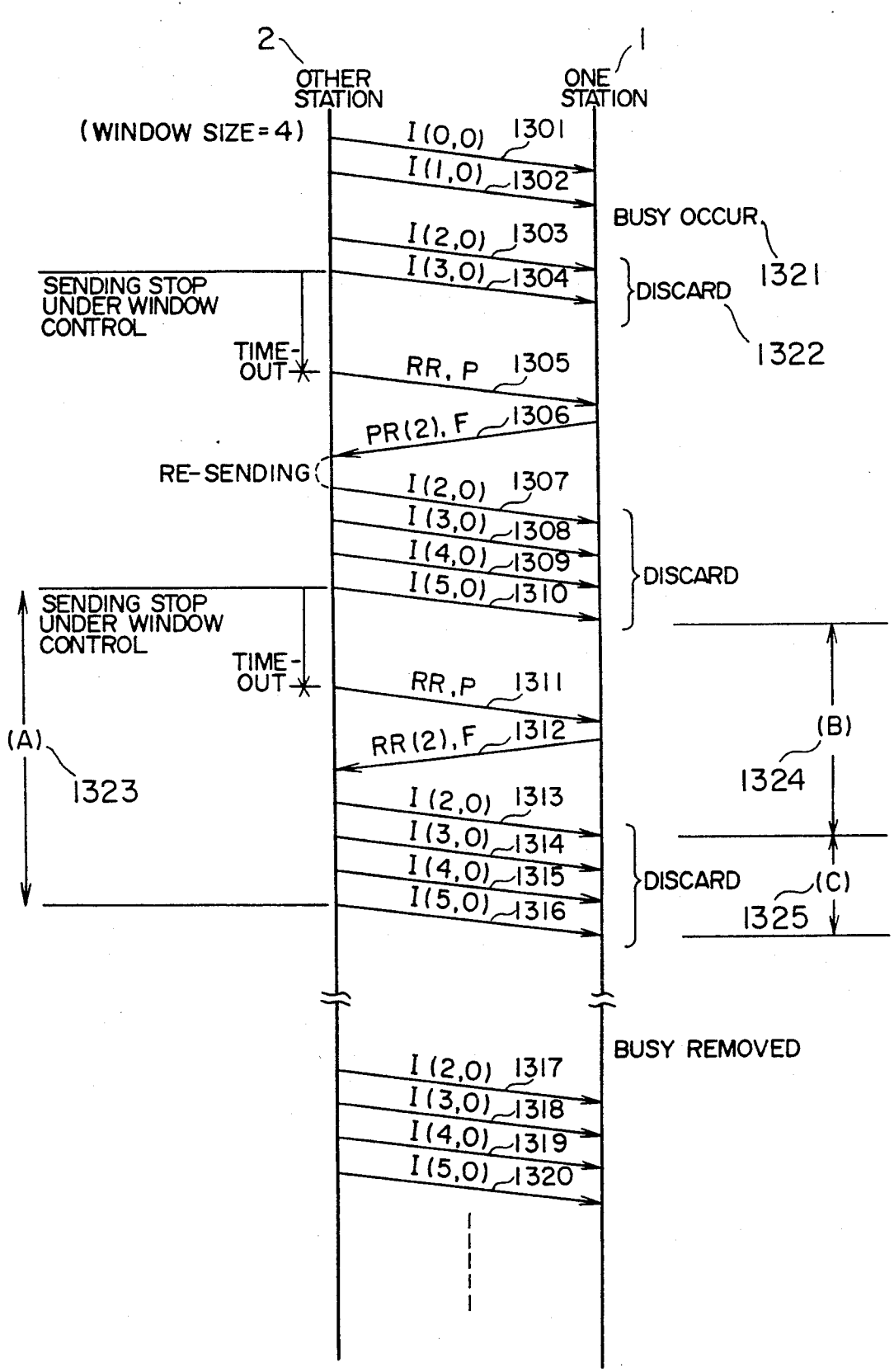

FIG. 17 is a sequence diagram showing a further embodiment of the data link layer processing procedure in the packet communication method according to the invention.

Figure 4:
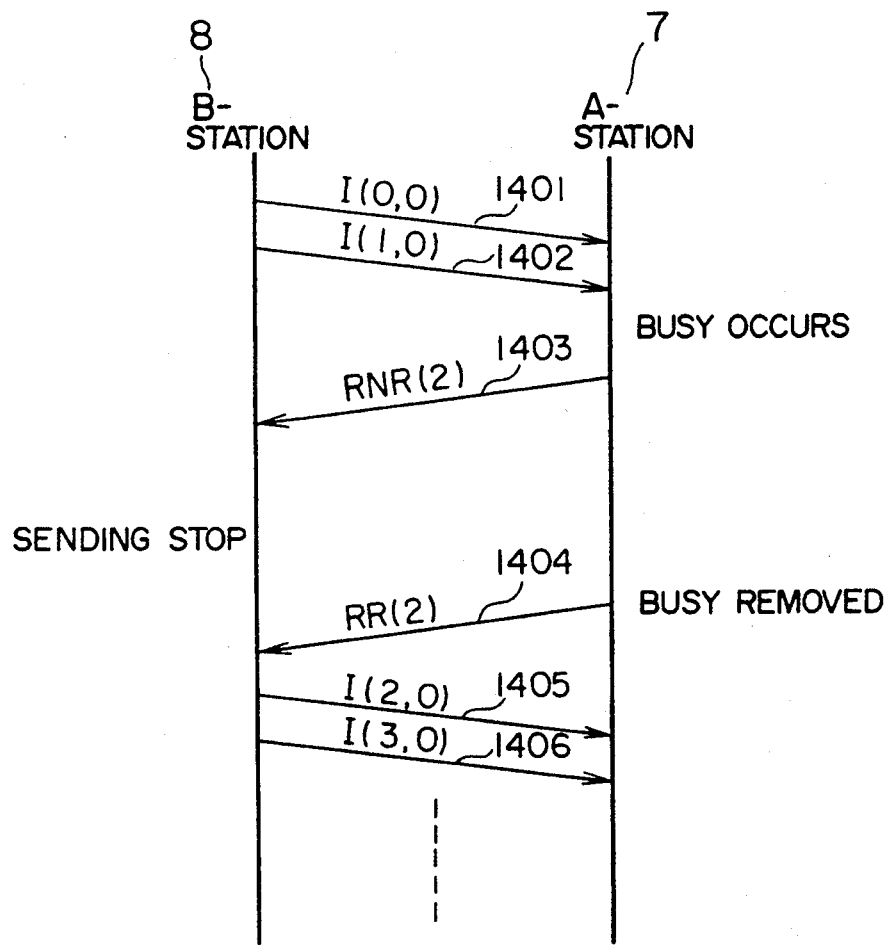

In FIG. 17, when a busy state in which the continuous reception of I frames is made impossible temporarily by inner limitation occurs (1321) in the one station 1, the one station 1 discards reception frames (1322) without issuing any report to the other station 2. The other station 2 sends an I frame I(3,0) 1304 and then stops the sending under the window control. After the sending of the I frame I(3,0) 1304, the other station 2 starts the timer and sends an RR,P frame 1305 after the timer becomes time-out. Whenever the one station 1 receives a frame having the P bit=1, the one station 1 sends a frame having the F bit=1. Having no frame sending request upon reception of the RR,P frame 1305, the one station 1 sends an RR(2),F frame 1306. Because the receiving sequence number N(R) of the frame 1306 having the F bit=1 received by the other station 2 in response to the frame 1305 having the P bit=1 sent after the sending of the I frames I(2,0) 1303 and I(3,0) 1304 is 2, the other station 2 re-sends (1307 to 1310) I frames on and after I(2,0) according to the HDLC procedure till the sending is stopped by the window control (the conventional re-sending procedure as described above with reference to FIG. 2). The other station 2 repeats a period of (A) 1323 while the one station 1 is busy (the one station 1 repeats a period of (B) 1324 and a period of (C) 1325). If the busy state of the one station 1 is canceled in the period (B), all the frames from the other station 2 reach the one station 1 normally. If the busy state of the one station 1 is canceled in the period (C), frames reaching the one station 1 before the cancellation of the busy state are discarded and no re-sent. The discarded frames solved by the recovery procedure in the higher layer. According to the present invention, the one station 1 has no necessity of notifying the occurrence and cancellation of the busy state to the other station through the RNR and RR frames as described above in the prior art with reference to FIG. 4. The management of the busy state of the one station, therefore, is unnecessary, so that the number of inner statuses can be reduced.

FIG. 18 is a view showing the configuration of the inside of the superspeed packet switch 1521 for performing the data link layer processing procedure in the packet communication method according to the invention. Reference numeral 1601 designates a line handling portion for performing real-time processing, such as connection of interface lines 1605 from the packet switching network, control of physical layers, addition/removal of flags of the data link layer, insertion/deletion of zero, FCS check and the like. Reference numeral 1602 designates a memory for storing frames exchanged through the line handling portion 1601 and programs for execution by a processor 1603. Reference numeral 1603 designates a processor for executing the data link layer processing procedure in the packet communication method according to the invention and for performing processing for transference in the inside of the superspeed packet switching network. reference numeral 1604 designates a relay processing portion connected to inter-network lines 1606 from other superspeed packet switches in the superspeed packet switching network and provided for performing high-speed switching by hardware in the high-speed packet switching network. Although the embodiment in FIG. 18 shows the case where the data link layer processing is carried out by software, the invention is applicable to the case where the processing is carried out by hardware.

FIGS. 19A and 19B are status transition tables showing an example of the data link layer processing (to which the data link layer processing method according to the present invention is applied) conducted by the high-speed packet switch 1521 in the case where the data link layer of the packet switch (the other station) connected obeys the HDLC class BA procedure. In FIGS. 19A and 19B, the transverse expresses statuses and the vertical expresses status transition factors. In each of the frames in intersections thereof, the upper stage expresses the status symbol of a destination of transition, and the lower stage expresses the number of a task to be processed. If one of the status transition factors expressed by the vertical in FIGS. 19A and 19B occurs when the one station 1521 is in one of the statuses expressed by the transverse in FIGS. 19A and 19B, the one station 1521 performs processing of the task expressed by the lower stage in the frame in an intersection of the vertical and the transverse and then changes to the status expressed by the upper stage. FIG. 20 is a list of processing tasks designated in FIGS. 19A and 19B. The counter 0 represents "out-standing I frame number", that is, the number of I frames which have been sent but unconfirmed in reception by the other station. By setting aforementioned WS (window size) in the counter O, an I frame send-disabled state can be expressed. If O=WS, the one station 1521 cannot send I frames regardless of the I frame sending request. In this case, the RR,P frame sending request is produced. In the status transition tables in FIGS. 19A and 19B, the number of the statuses expressed by the transverse is about one-fifth the number of statuses in the status transition table of the HDLC class BA procedure. Further, the number of items in the task list of FIG. 20 is not more than about one-sixth the number of items in the task list of the HDLC class BA procedure.

Figure 21:
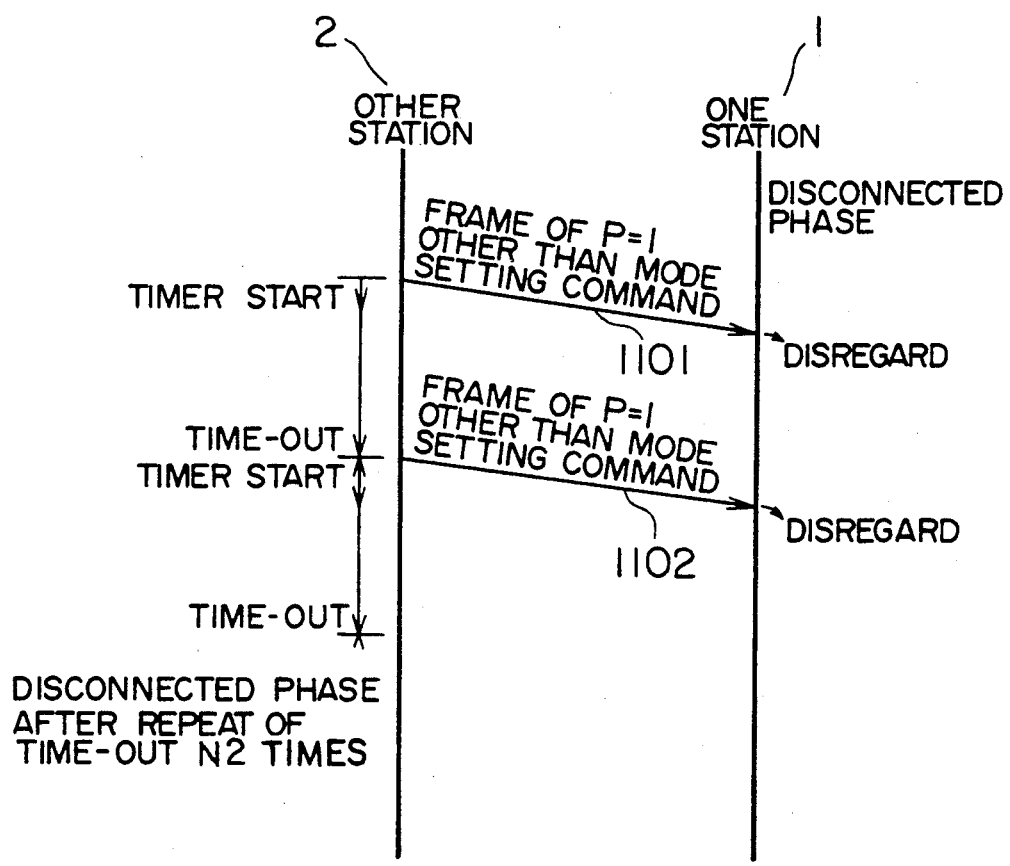

In the data link layer processing shown in FIGS. 19A, 19B and 20, various aspects of the present invention are used in combination and, further, the following procedure shown in FIG. 21 is used. In FIG. 21, when the one station 1 is in a disconnected phase, the one station 1 does not perform anything though a frame 1101 having the P bit=1 except the mode setting command is received. After the other station 2 sends the frame 1101, the other station 2 starts the timer. When the timer becomes time-out, the other station 2 re-sends the same frame 1102. The other station 2 repeats the re-sending and the time-out by the number of maximum sending times (N2 times) defined by CCITT RED BOOK and then turns in a disconnected phase, this reduces the processing load on the one station 1. By combining various aspects of the invention to form a closed data link layer protocol to be supported by the one station, the one station looks like a supporter of the same procedure HDLC class BA as that of the other station from the view of the other station, but the one station can lighten the procedure remarkably as compared with HDLC class BA procedure, reduce the frame sending break caused by the window control and conduct the procedure with no buffer for re-sending frames.

By using the simplified procedure as shown in FIGS. 19A, 19B and 20 in the data link layer of the superspeed packet switches 1521 and 1525 used as interfaces for the outside of the superspeed packet switching network 1506, the delay time in the superspeed packet switching network 1506 can be reduced and the quantity of hardware in the superspeed packet switches 1521 and 1525 can be reduced.

The present invention can be applied not only to interfaces for superspeed packet switching networks as shown in FIG. 5, but also the invention can be applied to interfaces between terminals having conventional protocol and new terminals communicated therewith. By simplification of controlling, it is possible to attain reduction of delay time and reduction of hardware quantity according to the invention, reduction in cost of the new terminals, improvement in processing speed and increase in the number of lines capable of being connected.

Having described the invention in the case where the invention is applied to HDLC, it is to be understood that the invention is not limited thereto and that the invention can be applied to connection type data link protocols such as SDLC (synchronous data link control), LLC (logical link control) and the like.

According to the present invention, the data link layer processing load on an apparatus (the one apparatus) communicated with another apparatus (the other apparatus) performing a data link layer processing according to HDLC or the like is reduced with no contradiction with respect to the other apparatus, by which the processing delay time in the one apparatus is shortened and, further, the continuous break of sent and received I frames caused by window control is reduced, by which there arises an effect in that the delay time both in the other apparatus and in the one apparatus can be shortened. Accordingly, in the case where a superspeed packet switch is connected as the one apparatus and a conventional packet switch as the other apparatus, the advantage of the superspeed packet switching network in low delay time is not lost, by which there arises an effect in that voice quality can be improved, in particular, in the case where voice information is transferred.

Further, according to the invention, no buffer for re-sending frames may be provided in the one apparatus, by which there arises an effect in hardware saving. Further, according to the invention, logical circuits can be simplified because processing is simplified in the case where processing is carried out by hardware, by which there arises an effect in hardware saving. Further, there arises an effect in cost saving caused by such hardware saving.

Further, according to the invention, in the case where a superspeed packet switch is connected as the one apparatus and a conventional packet switch as the other apparatus, the one apparatus can adjust the rate of frames entering into the superspeed packet switching network at the entrance thereof by sending an RR frame based on a timer set suitably, by which there arises an effect in that discard of frames can be prevented.

Further, according to the invention, processing in the one apparatus is simplified and accordingly improved in speed, so that the number of lines capable of being connected to the one apparatus increases, by which there arises an effect in improvement in throughput.

We claim:

1. A packet communication processing method for communication of packets between a sending end apparatus which sends said packets and a destination end apparatus which receives said packets through a network system having a plurality of node apparatuses, in which at least one of said node apparatuses located on a route between said sending end apparatus and said destination end apparatus contains a communication apparatus for communicating control frames and information frames with an adjacent one of said node apparatuses or an adjacent one of said end apparatuses located on said route, the adjacent one node apparatus or the adjacent one end apparatus implementing a connection type data link protocol which is of high level data link control, synchronous data link control or of logical link control, each one of said information frames includes one of said packets and a sending sequence number for expressing a sequence for sending said information frames, said method comprising:

a first step in which said communication apparatus accepts information frames received from the adjacent one node apparatus or the adjacent one end apparatus regardless of whether said sending sequence number of each of said information frames is correct or not and sends out the packets included in said accepted information frames onto a destination end apparatus side route, in which said first step includes,
a step of counting a number of information frames received; and
a step of sending a receive-ready frame to the adjacent one node apparatus or to the adjacent one end apparatus whenever said number of information frames received reaches a predetermined value, for indicating that said communication apparatus is ready to receive new information frames;

a second step in which said destination end apparatus detects that packets sent from said sending end apparatus are missing, and in which said destination end apparatus sends a notification of the missing of packets to said sending end apparatus; and a third step in which said sending end apparatus resends the missing packets or a series of packets containing said missing packets upon reception of said notification of the missing of packets.

2. A packet communication processing method according to claim 1, in which said receive-ready frame contains a receiving sequence number for notifying said adjacent node apparatus or said adjacent end apparatus of a confirmation of reception of said information frames, said receiving sequence number being obtained by incrementing by 1 the sending sequence number of a newest information frame of the information frames which said communication apparatus has received.

3. A packet communication processing method for communication of packets between a sending end apparatus which sends said packets and a destination end apparatus which receives said packets through a network system having a plurality of node apparatuses, in which at least one of said node apparatuses located on a route between said sending end apparatus and said destination end apparatus contains a communication apparatus for communicating control frames and information frames with an adjacent one of said node apparatuses or an adjacent one of said end apparatuses located on said route, the adjacent one node apparatus or the adjacent one end apparatus implementing a connection type data link protocol which is of high level data link control, synchronous data link control, or of logical link control, each one of said information frames includes one of said packets and a sending sequence number for expressing a sequence for sending said information frames, said method comprising:

a first step in which said communication apparatus accepts information frames received from the adjacent one node apparatus or the adjacent one end apparatus regardless of whether said sending sequence number of said information frames is correct or not and sends out the packet included in said accepted information frames onto a destination end apparatus side route, in which said first step includes,
a step in which said communication apparatus sends a receive-ready frame at a predetermined time period to the adjacent one node apparatus or to the adjacent one end apparatus for notifying said adjacent node apparatus or said adjacent end apparatus that said communication apparatus is ready to receive new information frames;

a second step in which said destination end apparatus detects that packets sent from said sending end apparatus are missing, and in which said destination end apparatus sends a notification of the missing of packets to said sending end apparatus; and a third step in which said sending end apparatus resends the missing packets or a series of packets containing said missing packets upon reception of said notification of the missing of packets.

4. A packet communication processing method according to claim 3, further comprising a fourth step in which in response to the reception of a frame having a P bit set to "1", said communication apparatus sends one of said control frames or one of said information frames having an F bit set to "1" to said adjacent node apparatus or said adjacent end apparatus for notifying said adjacent node apparatus or said adjacent end apparatus that said communication apparatus is ready to receive the information frames, each one of said receive-ready frames being sent periodically in the first step and said control frame or information frame having an F bit set to "1" in the fourth step containing a receiving sequence number being obtained by an increment of 1 of the sending sequence number of a newest information frame of the information frames which were sent from said adjacent node apparatus or said adjacent end apparatus to said communication apparatus, and
each control frame or information frame which is not the receive-ready frame sent periodically in the first step and which is not the control frame or information frame having an F bit set to "1" in the fourth step contains a receiving sequence number which is equal to the receiving sequence number of the newer of said receive-ready frame sent periodically in the first step or said control or information frame having an F bit set to "1" in the fourth step.

5. A packet communication processing method for communication of packets between a sending end apparatus which sends said packets and a destination end apparatus which receives said packets through a network system having a plurality of node apparatuses, in which at least one of said node apparatuses located on a route between said sending end apparatus and said destination end apparatus contains a communication apparatus for communicating control frames and information frames with an adjacent one of said node apparatuses or an adjacent one of said end apparatuses located on said route, the adjacent one node apparatus or the adjacent one end apparatus implementing a connection type data link protocol which is of high level data link control, synchronous data link control, or of logical link control, each one of said information frames includes one of said packets and a sending sequence number for expressing a sequence for sending said information frames, said method comprising:

a step in which said communication apparatus sends information frames of not more than a predetermined number to said adjacent one node apparatus or said adjacent one end apparatus under a window control scheme which allows said communication apparatus to send a maximum of a predetermined number of information frames without receiving an acknowledgement frame which is sent from said adjacent node apparatus or said adjacent end apparatus in order to notify said communication apparatus of receipt of one or more of said information frames, under said window control scheme said communication apparatus can send unacknowledged information frames within the limit of said predetermined number;

a step in which said communication apparatus sends each one of said information frames without using a timer for a supervision of reception of said acknowledgement frame;

a step in which said communication apparatus sends the last one of said not more than the predetermined number of information frames with a P bit set to "1";

a step in which said communication apparatus sends further unacknowledged information frames within the limit of said predetermined number under said window control scheme in response to the reception of an acknowledgement frame which is sent from said adjacent node apparatus or said adjacent end apparatus and which has an F bit set to "1" and which indicates that said adjacent node apparatus or said adjacent end apparatus is ready to receive new information frames, said acknowledgement frame being issued by said adjacent node apparatus or said adjacent end apparatus in response to said information frame having its P bit set to "1";

a step in which said destination end apparatus detects that packets sent from said sending end apparatus are missing, and in which said destination end apparatus sends a notification of the missing of packets to said sending end apparatus; and a step in which said sending end apparatus re-sends the missing packets or a series of packets containing said missing packets upon reception of said notification of the missing of packets.

6. A packet communication processing method according to claim 5, in which said information frame with its P bit set to "1" is sent without changing a value of an inner state variable of said communication apparatus which indicates that the communication apparatus has set a frame with its P bit set to "1" and has not received a response.

7. A packet communication processing method for communication of packets between a sending end apparatus which sends said packets and a destination end apparatus which receives said packets through a network system having a plurality of node apparatuses, in which at least one of said node apparatuses located on a route between said sending end apparatus and said destination end apparatus contains a communication apparatus for communicating control frames and information frames with an adjacent one of said node apparatuses or an adjacent one of said end apparatuses located on said route, the adjacent one node apparatus or the adjacent one end apparatus implementing a connection type data link protocol which is of high level data link control, synchronous data link control or of logical link control, each one of said information frames includes one of said packets and a sending sequence number for expressing a sequence for sending said information frames, said method comprising:

a step in which said adjacent node apparatus or said adjacent end apparatus sends a reject frame to said communication apparatus for indicating an information frame sent from said communication apparatus is missing;

a step in which said communication apparatus sends a mode reset requesting frame to said adjacent node apparatus or said adjacent end apparatus;

a step in which said adjacent node apparatus or said adjacent end apparatus sends a response frame which indicates said mode reset requesting frame is acknowledge, and said adjacent node apparatus or said adjacent end apparatus resets inner variables used for managing a receiving sequence number and said sending sequence number included in said frames;

a step in which said communication apparatus receives said response frame from said adjacent node apparatus or said adjacent end apparatus and then resets inner variables used for managing said receiving sequence number and said sending sequence number;

a step in which said destination end apparatus detects that packets sent from said sending end apparatus are missing, and in which said destination end apparatus sends a notification of the missing of packets to said sending end apparatus; and a step in which said sending end apparatus re-sends the missing packets or a series of packets containing said missing packets upon reception of said notification of the missing of packets.

8. A packet communication processing method for communication of packets between a sending end apparatus which sends said packets and a destination end apparatus which receives said packets through a network system having a plurality of node apparatuses, in which at least one of said node apparatuses located on a route between said sending end apparatus and said destination end apparatus contains a communication apparatus for communicating control frames and information frames with an adjacent one of said node apparatuses or an adjacent one of said end apparatuses located on said route, said adjacent one node apparatus or said adjacent one end apparatus implementing a connection type data link protocol which is of high level data link control, synchronous data link control or of logical link control ,each one of said information frames includes one of said packets and a sending sequence number for expressing a sequence for sending said information frames, said method comprising:

a step in which when a higher layer processing part of said communication apparatus detects that there are information frames to be sent from said communication apparatus to said adjacent node apparatus or to said adjacent end apparatus, said higher layer processing part sends a send instruction to said data link layer processing part of said communication apparatus, said send instruction instructs said data link layer processing part to send out said information frames to said adjacent node apparatus to said adjacent end apparatus;

a step in which said higher layer processing part detects whether said information frames are sent out from said communication apparatus and when said information frames are not sent out after a predetermined time, said higher layer processing part sends said send instruction again, a time-out processing which is made up of said sending of said send instruction and said detection which are repeated until said information frames are set out or until a predetermined occurrence of repetition of said time-out processing;

a step in which if said information frames are not sent out after said predetermined occurrence of repetition of said time-out processing, said higher layer processing part sends a mode reset instruction to said data link layer processing part;

a step in which upon reception of said send instruction from said higher layer processing part, said data link layer processing part of said communication apparatus sends information frames of not more than a predetermined number to said adjacent one node apparatus or said adjacent one end apparatus under a window control scheme which allows said data link layer processing part of said communication apparatus to send a maximum of a predetermined number of information frames without receiving an acknowledgement frame which is sent from said adjacent node apparatus or said adjacent end apparatus in order to notify said communication apparatus of receipt of one or more of said information frames, under said window control scheme said data link layer processing part of said communication apparatus can send unacknowledged information frames within the limit of said predetermined number;

a step in which said adjacent note apparatus or said adjacent end apparatus detects one of said information frames sent from said communication apparatus is missing, and in which said adjacent node apparatus or said adjacent end apparatus sends a reject frame notifying said communication apparatus of said missing information frame, and in which after said sending of said reject frame, said adjacent node apparatus or said adjacent end apparatus discards all information frames received from said communication apparatus until reception of said missing one information frame;

a step in which said communication apparatus disregards reception of said reject frame sent from said adjacent node apparatus or said adjacent end apparatus;

a step in which upon reception of said mode reset instruction from said higher layer processing part, said data link layer processing part of said communication apparatus sends a mode reset request frame to said adjacent node apparatus or said adjacent end apparatus;

a step in which upon reception of said mode reset request frame, said adjacent node apparatus or said adjacent end apparatus sends a response frame notifying said mode reset request frame is acknowledged, and said adjacent node apparatus or said adjacent end apparatus resets inner variables used for managing a receiving sequence number and said sending sequence number included in said frames;

a step in which said data link layer processing part of said communication apparatus receives said response frame from said adjacent node apparatus or said adjacent end apparatus and then resets inner variables used for managing said receiving sequence number and said sending sequence number;

a step in which said destination end apparatus detects packets sent from said sending end apparatus are missing, and in which said destination end apparatus sends a notification of the missing of packets to said sending end apparatus; and a step in which said sending end apparatus re-sends the missing packets or a series of packets containing said missing packets upon reception of said notification of the missing of packets.

9. A packet communication processing method for communication of packets between a sending end apparatus which sends said packets and a destination end apparatus which receives said packets through a network system having a plurality of node apparatuses, in which at least one of said node apparatuses located on a route between said sending end apparatus and said destination end apparatus contains a communication apparatus for communicating control frames and information frames with an adjacent one of said node apparatuses or an adjacent one of said end apparatuses located on said route, the adjacent one node apparatus or the adjacent one end apparatus implementing a connection type data link protocol which is of high level data link control, synchronous data link control or of logical link control, each one of said information frames includes one of said packets and a sending sequence number for expressing a sequence for sending said information frames, said method comprising:

a step in which when a busy state occurs in said communication apparatus which temporarily prohibits said communication apparatus from accepting received information frames into a buffer of said communication apparatus, said communication apparatus discards said information frames without notifying the adjacent node apparatus or the adjacent end apparatus of the occurrence of said busy state;

a step in which said communication apparatus accepts information frames into said buffer of said communication apparatus when said information frames are sent from said adjacent node apparatus or said adjacent end apparatus to said communication apparatus after said busy state is removed;

a step in which said destination end apparatus detects that packets sent from said sending end apparatus are missing, and in which said destination end apparatus sends a notification of the missing of packets to said sending end apparatus; and a step in which said sending end apparatus re-sends the missing packets or a series of packets containing said missing packets upon reception of said notification of the missing of packets.

* * * * *

UNITED STATES PATENT AND TRADEMARK OFFICE
CERTIFICATE OF CORRECTION

PATENT NO. : 5,168,497
DATED : December 1, 1992
INVENTOR(S) : Seiichi Ozaki, et al.

It is certified that error appears in the above-identified patent and that said Letters Patent is hereby corrected as shown below:

Claim 3, column 18, line 8, delete "packet" and replace with --packets--.

Claim 6, column 19, line 57, delete the first occurrence of "set" and replace it with --sent--.

Claim 7, column 20, line 21, delete "acknowledge" and replace with --acknowledged--.

Claim 8, column 21, line 1, delete the second occurrence of "to" and replace with --or--.

Claim 8, column 21, line 38, delete "note" and replace with --node--.

Signed and Sealed this

Twenty-sixth Day of October, 1993

Attest:

BRUCE LEHMAN

*Attesting Officer*  *Commissioner of Patents and Trademarks*